US011971991B2

(12) United States Patent
Tsuchitoi

(10) Patent No.: US 11,971,991 B2
(45) Date of Patent: Apr. 30, 2024

(54) INFORMATION PROCESSING APPARATUS, CONTROL METHOD FOR CONTROLLING THE SAME AND STORAGE MEDIUM

(71) Applicant: CANON KABUSHIKI KAISHA, Tokyo (JP)

(72) Inventor: Naoki Tsuchitoi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 18/048,347

(22) Filed: Oct. 20, 2022

(65) Prior Publication Data
US 2023/0126541 A1 Apr. 27, 2023

(30) Foreign Application Priority Data
Oct. 25, 2021 (JP) ................................. 2021-173743

(51) Int. Cl.
*G06F 21/57* (2013.01)
*G06F 21/31* (2013.01)
(52) U.S. Cl.
CPC .............. *G06F 21/57* (2013.01); *G06F 21/31* (2013.01)

(58) Field of Classification Search
CPC ........ G06F 21/57; G06F 21/31; G06F 21/572; G06F 21/64; G06F 21/608
See application file for complete search history.

(56) References Cited

U.S. PATENT DOCUMENTS

2009/0259795 A1* 10/2009 Panabaker .............. G06F 12/00
2021/0097820 A1* 4/2021 Lambardo ............... G06F 17/74

FOREIGN PATENT DOCUMENTS

JP        2019212114 A    12/2019
WO    WO2014201830    * 12/2014

\* cited by examiner

*Primary Examiner* — Anthony Bantamoi
(74) *Attorney, Agent, or Firm* — Canon U.S.A., Inc. IP Division

(57) ABSTRACT

An information processing apparatus includes a determination unit configured to determine whether a user has authority to set setting data, a reception unit configured to, in a case where it is determined that the user has the authority to set the setting data, receive a setting of the setting data, a generation unit configured to generate verification data on the received setting data, and a verification unit configured to, in a case where the information processing apparatus starts, verify the setting data using the verification data.

11 Claims, 23 Drawing Sheets

FIG.19

| ITEM | SECURITY ATTRIBUTE | SETTING VALUE | |
|---|---|---|---|
| USE AUTHENTICATION | YES | YES | ~1911 |
| ENCRYPT COMMUNICATION PATH | YES | YES | ~1912 |
| COLOR/MONOCHROME | NO | YES | ~1913 |
| SHEET SIZE | NO | NO | ~1914 |

FIG.20

| CHANGE IN SETTING | ADVERSE INFLUENCE OF CHANGE IN SETTING |
|---|---|
| ENABLE WIRELESS LAN | DEVICE CAN BE WIRELESSLY USED FROM OUTSIDE OFFICE |
| ENABLE USB DEVICE | PRINTING CAN BE USED BY AVOIDING RESTRICTION OF NETWORK |
| DISABLE VERIFICATION OF TLS SERVER CERTIFICATE | DETECTION OF IMPERSONATION OF SERVER CAN BE PREVENTED |
| ENABLE PLAIN TEXT AUTHENTICATION OF SERVER FUNCTIONS | PASSWORD CAN BE LEAKED |
| MAKE SNMP v1 AVAILABLE | SNMP v1 CAN BE USED WITHOUT AUTHENTICATION |
| ENABLE VARIOUS NW PORTS | PORT WITHOUT AUTHENTICATION CAN BE USED (RAW PORT) |
| EASE RULE OF PASSWORD | AUTHENTICATION IS CLEARED BY SETTING WEAK PASSWORD (ONE-DIGIT FIGURE) |
| DISABLE LOCKOUT | AUTHENTICATION CAN BE PERFORMED MANY TIMES OVER SHORT TIME |
| ENABLE WEAK CODE | WEAK CODE CAN BE DECRYPTED |
| DISABLE AUDIT LOG | TRACE OF ATTACK DOES NOT REMAIN BECAUSE AUDIT LOG DOES NOT REMAIN |
| DISABLE RESERVATION OF JOB | PRINTING RESULT OF OUTPUT DOCUMENT CAN BE STOLEN |
| DISABLE NEW DESTINATION LIMITATION | INFORMATION CAN BE SENT TO UNKNOWN FAX NUMBER |
| DISABLE USER AUTHENTICATION | ANYONE CAN USE DEVICE |

INFORMATION PROCESSING APPARATUS, CONTROL METHOD FOR CONTROLLING THE SAME AND STORAGE MEDIUM

BACKGROUND

Field of the Disclosure

The present disclosure relates to an information processing apparatus such as a multifunction peripheral connected to a network.

Description of the Related Art

Multifunction peripherals (MFPs) of recent years include a network interface and have functions comparable to those of a personal computer (PC) or a server, such as a file server function and an email transmission/reception function. In such circumstances, the multifunction peripherals also have an issue such as the improper use of the apparatus by improper hacking similarly to the PC or the server. Particularly, an attack for ransom called ransomware influences a social infrastructure. It is difficult to create invulnerable apparatus, and therefore, measures assuming intrusions are generally taken.

In many cases, a built-in information processing apparatus such as a multifunction peripheral is designed to use only firmware assumed before shipment. In such a case, the following measures are discussed. Verification data on an individual file of available firmware is stored in advance. When firmware is used, a start time falsification detection function verifies the falsification of the firmware using the verification data, and then makes only proper firmware available, thereby preventing an improper operation (see Japanese Patent Application Laid-Open No. 2019-212114).

The firmware falsification detection function of the conventional apparatus can prevent an irregular change in firmware. However, setting data for setting functions included in the firmware can be freely changed by a user, and therefore, verification data cannot be created in advance at the factory. Thus, the firmware falsification detection function cannot deal with an improper falsification. Meanwhile, the values of the above settings include many settings that influence security, such as a port opening setting and a user authentication setting. There is an issue that an attacker capable of falsifying the firmware can disable a security function by rewriting the setting values of the apparatus without falsifying the firmware using the conventional falsification detection function.

SUMMARY

In view of the above circumstances, the present disclosure is directed to providing a technique capable of, even if a setting value of an apparatus is improperly rewritten, preventing the apparatus from being improperly used.

According to an aspect of the present disclosure, an information processing apparatus includes a determination unit configured to determine whether a user has authority to set setting data, a reception unit configured to, in a case where it is determined that the user has the authority to set the setting data, receive a setting of the setting data, a generation unit configured to generate verification data on the received setting data, and a verification unit configured to, in a case where the information processing apparatus starts, verify the setting data using the verification data.

Further features of the present disclosure will become apparent from the following description of exemplary embodiments with reference to the attached drawings.

BRIEF DESCRIPTION OF THE DRAWINGS

FIG. 19 illustrates an example of a file configuration on the storage device that stores the setting data.

FIG. 20 illustrates examples of an influence of a change in a security setting.

DESCRIPTION OF THE EMBODIMENTS

With reference to the drawings, various embodiments for carrying out the present disclosure will be described below. In a first exemplary embodiment, an example is illustrated where a multifunction peripheral (MFP) is used as an information processing apparatus.

Figure 1:
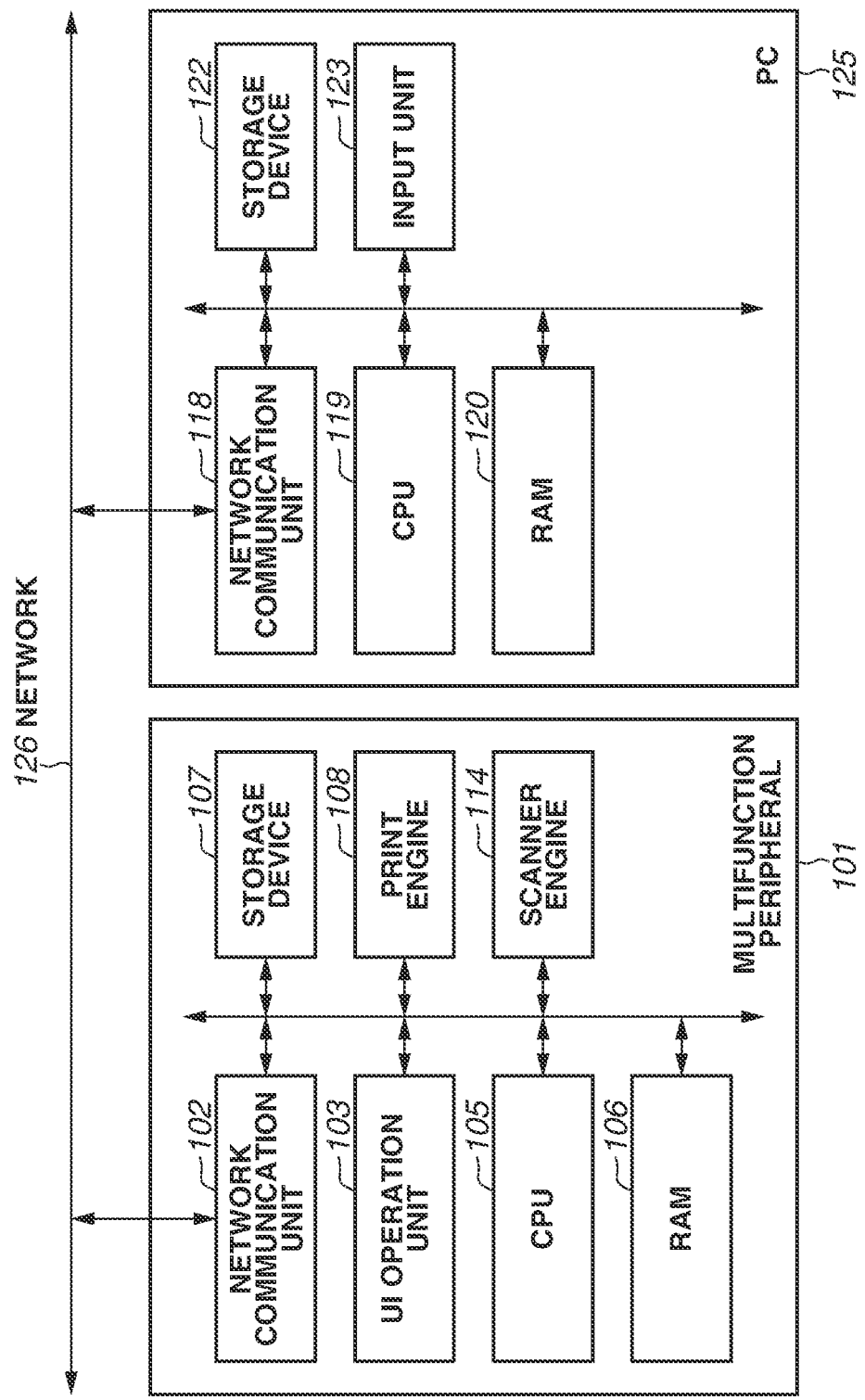
FIG. 1 is a block diagram illustrating a configuration according to one or more aspects of the present disclosure.

FIG. 1 is a block diagram illustrating the configuration of the present exemplary embodiment. FIG. 1 illustrates a multifunction peripheral 101 and a personal computer (PC) 125. The multifunction peripheral 101 and the PC 125 are connected together by a network 126.

For example, the PC 125 creates image data desired by a user, using document creation software, generates print data, transmits the print data to the multifunction peripheral 101, and gives a print instruction to the multifunction peripheral 101. The PC 125 includes a network communication unit 118 that communicates with the network 126, a central processing unit (CPU) 119 that controls the operation of the entirety of the PC 125, and a random-access memory (RAM) 120 that records temporary information regarding the PC 125. Further, the PC 125 includes a storage device 122 that permanently records information, and an input unit 123 such as a keyboard and a mouse that receives an input from the user.

The multifunction peripheral 101 includes a network communication unit 102 that communicates with the PC 125 via the network 126, and a user interface (UI) operation unit 103 that receives an input from the user and provides an output to the user using a liquid crystal display, a touch panel, and a hardware key. The multifunction peripheral 101 also includes a CPU 105 that controls the operation of the multifunction peripheral 101, such as the interpretation of print data and the conversion of the print data to a raster image, a RAM 106 that records temporary information regarding the multifunction peripheral 101, and a storage device 107 that permanently records information. The multifunction peripheral 101 also includes a print engine 108 that receives a raster image calculated by the CPU 105 and prints the raster image on a sheet medium, and a scanner engine 114 that reads an image written on a print document as a raster image, using an optical reading technique, and writes the raster image to the RAM 106.

Figure 5:
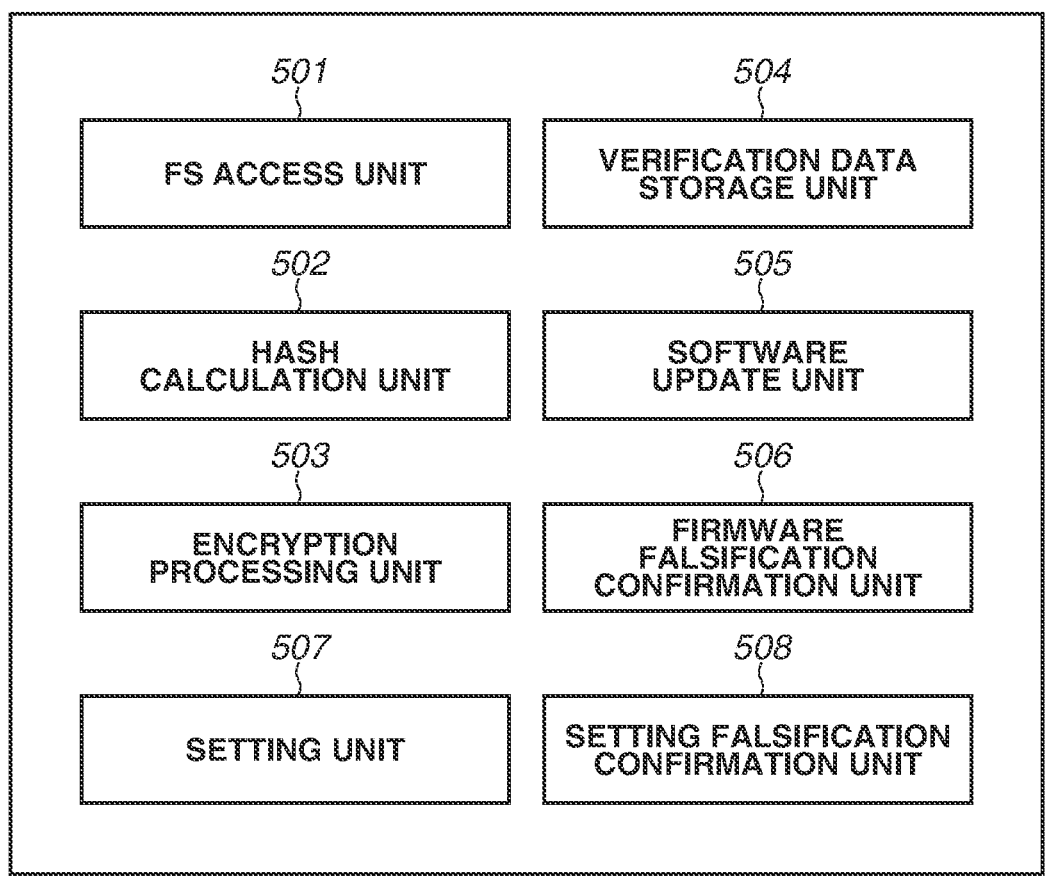
FIG. 5 is a block diagram of programs that operate on a multifunction peripheral.

FIG. 5 is a block diagram of programs that operate on the multifunction peripheral 101.

The programs are stored in the storage device 107 and are loaded into the RAM 106 when used. Then, the CPU 105 causes the programs to operate. A file system (FS) access unit 501 accesses the storage device 107. A hash calculation unit 502 calculates, from input data input to the hash calculation unit 502, output data of a fixed size (e.g., 32 bytes) unique to the input data using a known hash calculation algorithm (e.g., SHA-256). The hash calculation algorithm is characterized by one-wayness in which it is easy to create output data from input data, but it is logically difficult to generate different input data to output the same output data.

An encryption processing unit 503 generates, from input data input to the encryption processing unit 503, encrypted output data corresponding to the input data using a known encryption algorithm (e.g., the Advanced Encryption Standard (AES)). The encryption processing unit 503 is configured to have an encryption key unique to the multifunction peripheral 101 therein in advance so that the encryption key cannot be read from outside.

A verification data storage unit 504 saves correct verification values of a system file area and security setting data. The verification data storage unit 504 is placed in a setting data partition 202 in the storage device 107. A software update unit 505 updates software when a failure or a vulnerability is found. A firmware falsification confirmation unit 506 confirms whether software is falsified or improper software is installed. A setting unit 507 is used by the user to set the multifunction peripheral 101. A setting falsification confirmation unit 508 confirms whether a setting is improperly falsified.

As a firmware falsification detection method, the verification of a system partition is described below. This is an example of the firmware falsification detection method and is also applicable to another falsification detection method.

Figure 2:
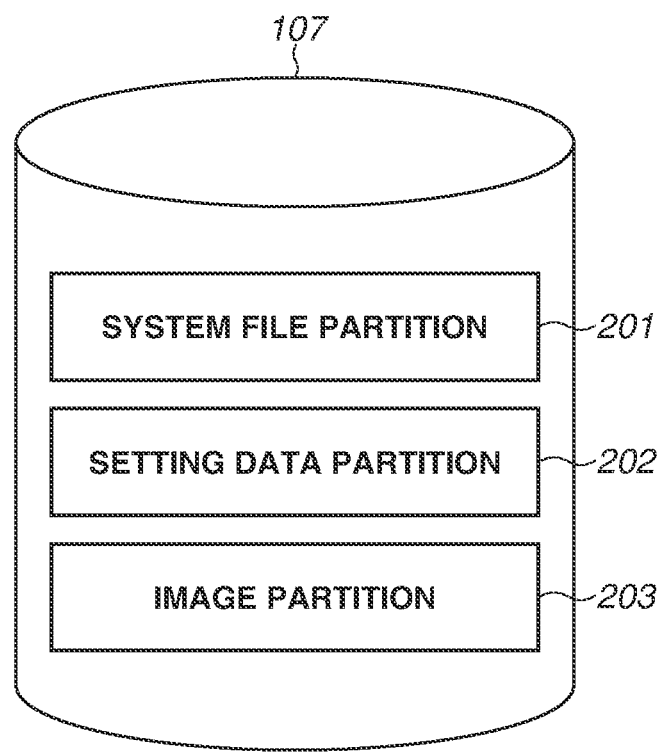
FIG. 2 is a block diagram illustrating internal placement of a storage device.

FIG. 2 is a block diagram illustrating the internal placement of the storage device 107. Normally, the storage device 107 is composed of a single storage device (e.g., a hard disk drive), but the inside of the storage device 107 can be divided into logical units (partitions). In the example of FIG. 2, the storage device 107 is divided into three partitions. That is, a system file partition 201 indicates a partition that stores fixed data that does not change in normal use, such as various programs as illustrated in FIG. 5 and language data. The setting data partition 202 indicates a partition that stores various settings for causing the multifunction peripheral 101 to operate and setting data as temporary information. An image partition 203 indicates a partition that stores print data received by the multifunction peripheral 101 and raster image data to be used in the print engine 108 or the scanner engine 114. This is merely an example, and the partitions may be further divided into more detailed partitions.

Since there is no room for changes in the various programs or the fixed data stored in the system file partition 201 in normal use (except for a software update), it can be assumed that the content of the system file partition 201 is always the same. On the other hand, the content of the setting data partition 202 or the image partition 203 is always rewritten by a change in a setting made by the user or a daily print or scan operation.

Figure 3A:
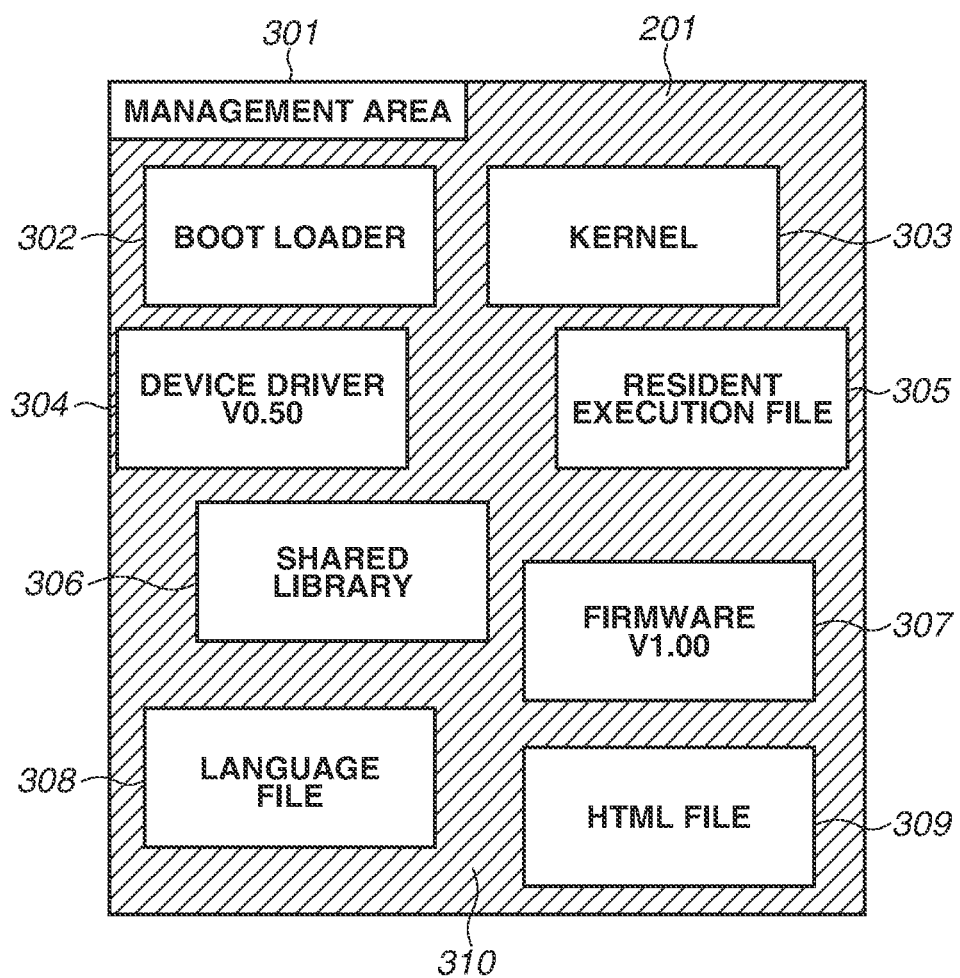
FIG. 3A is a schematic diagram illustrating an example where a system file partition is physically placed in the storage device.

FIG. 3A is a schematic diagram illustrating an example where the system file partition 201 is physically placed in the storage device 107. FIG. 3A illustrates the entirety of the system file partition 201. A management area 301 manages the placement of a file in the system file partition 201. A boot loader 302 determines a program to be booted when the multifunction peripheral 101 starts. A kernel 303 serves as the core of an operating system (OS). A device driver 304 causes the network communication unit 102 and the UI operation unit 103 to operate. A resident execution file 305 operates separately from firmware 307. A shared library 306 separate from the firmware 307 is referenced and executed by the firmware 307. The firmware 307 performs the operation of the multifunction peripheral 101. A language file 308 is separated from the firmware 307 for the multifunction peripheral 101 to handle multiple languages. A HyperText Markup Language (HTML) file 309 is used when the multifunction peripheral 101 is referenced from outside using the Hypertext Transfer Protocol (HTTP). The above files 302 to 309 are termed "system files". A shaded area 310 indicates an unused area in the partition.

Although a single system file is illustrated as each individual system file for ease of description, actually, a plurality of system files exists. For example, a plurality of device drivers exists according to devices connected to the multifunction peripheral 101.

In the entirety of the system file partition 201, the system files do not need to be orderly arranged. Actually, the individual system files are discretely placed as illustrated in FIG. 3A. The physical placement of these system files is managed by the management area 301, and the firmware 307 does not need to manage where the system files are physically placed. This means that even in the case of the firmware configuration of the same product and the same version, the placement of system files stored in the storage device 107 does not need to be exactly the same.

Next, the hash calculation of the system file partition 201 is described.

Figure 3B:
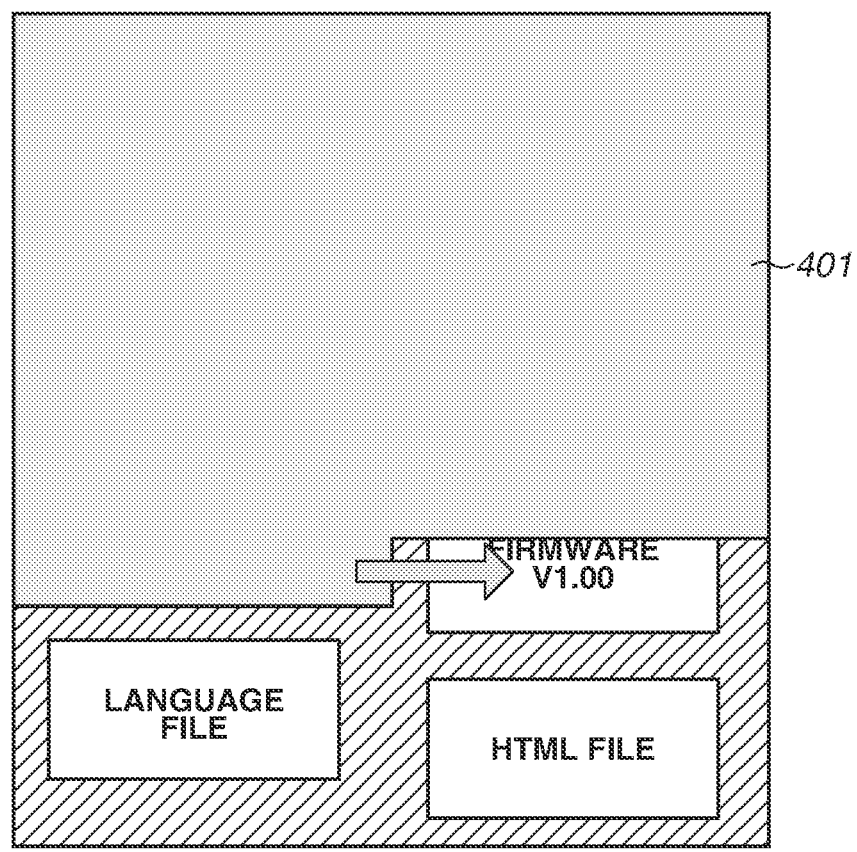
FIG. 3B is a schematic diagram illustrating hash calculation of an entirety of the system file partition.

FIG. 3B is a schematic diagram illustrating the hash calculation of the entirety of the system file partition 201. FIG. 3B illustrates a range 401 of the hash calculation. Although the range 401 indicates the calculation range up to halfway for ease of description in FIG. 3B, actually, the hash calculation is performed for the entirety of the system file partition 201, and only a single hash value is saved as verification data. At this time, the entirety of the system file partition 201 also including the unused area 310 is the calculation target. This hash value is a value uniquely created based on the placement of data in the system file partition 201. If the data in the entirety of the system file partition 201 changes by even one bit, a completely different hash value is calculated. Thus, it is possible to detect the falsification and the deletion of any program and the addition of a file that performs an improper operation.

Figure 4A:
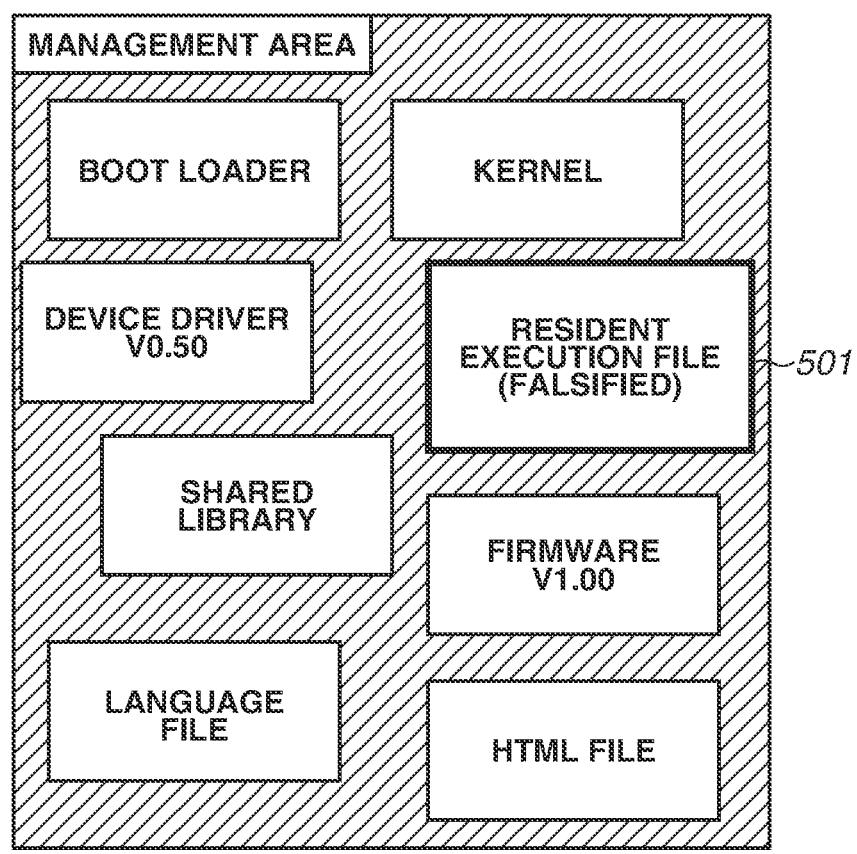
FIG. 4A is a schematic diagram illustrating an example of a falsification of a program.

FIG. 4A is a schematic diagram illustrating an example of the falsification of a program. If a legitimate program is falsified in a resident execution file 501, the size of the program changes, and the program is rewritten. The change and the rewriting change the hash value by rewriting the entirety of the partition and therefore can be detected.

Figure 4B:
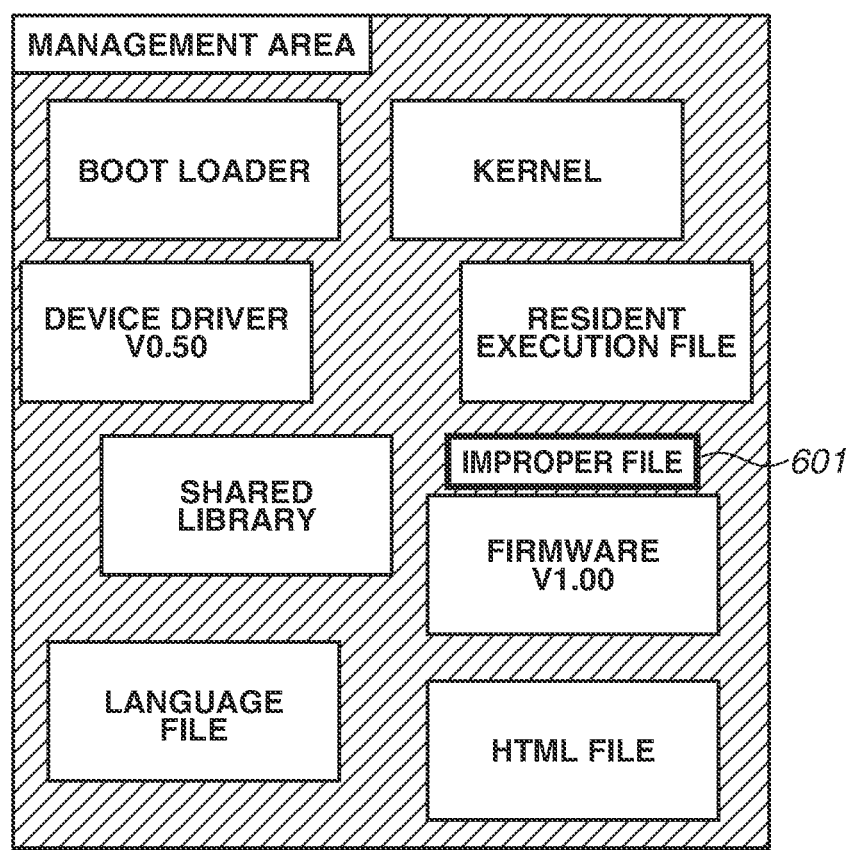
FIG. 4B is a schematic diagram illustrating an example of a case where an improper program is placed in the system file partition.

FIG. 4B is a schematic diagram illustrating an example of a case where an improper program is placed in the system file partition 201. An improper file 601 is different from a legitimate system file. Since the unused area 310 is originally used as the hash calculation target, the placement of such an improper file also changes the hash value and therefore can be detected as an alteration.

Figure 4C:
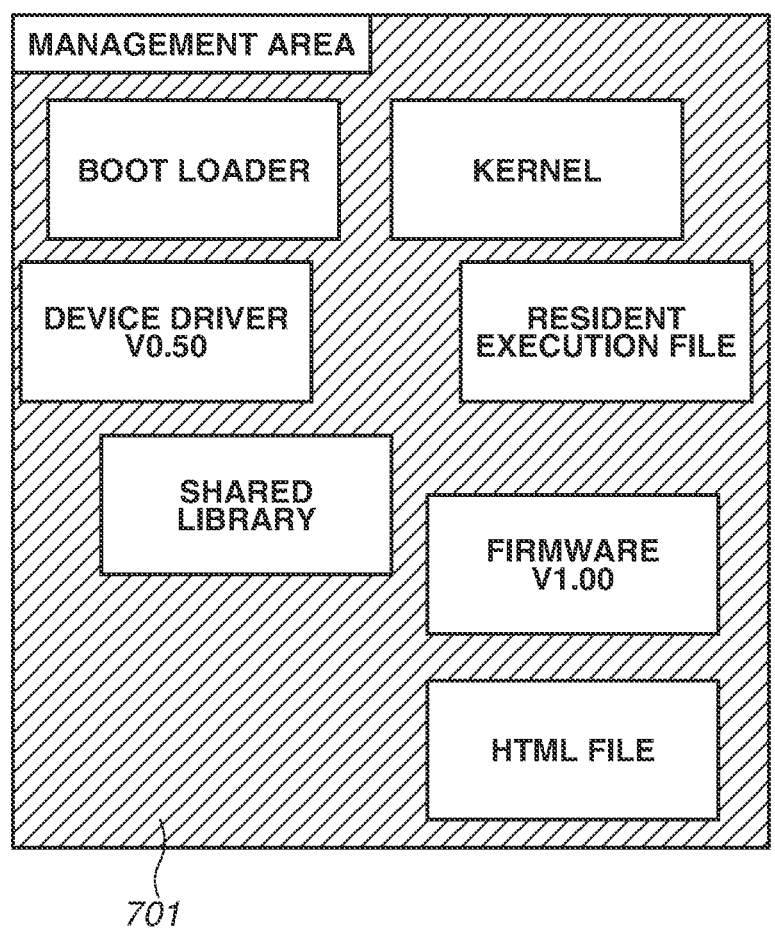
FIG. 4C is a schematic diagram illustrating an example of a case where a legitimate file is deleted from the system file partition by an improper operation.

FIG. 4C is a schematic diagram illustrating an example of a case where a legitimate file is deleted from the system file partition 201 by an improper operation. In FIG. 4C, the language file 308 is improperly deleted. In such deletion, the management area 301 is rewritten. The rewriting changes the hash value of the entirety of the system file partition 201 and therefore can be detected.

Next, the calculation of the hash value of the system file partition 201 is described.

Figure 6:
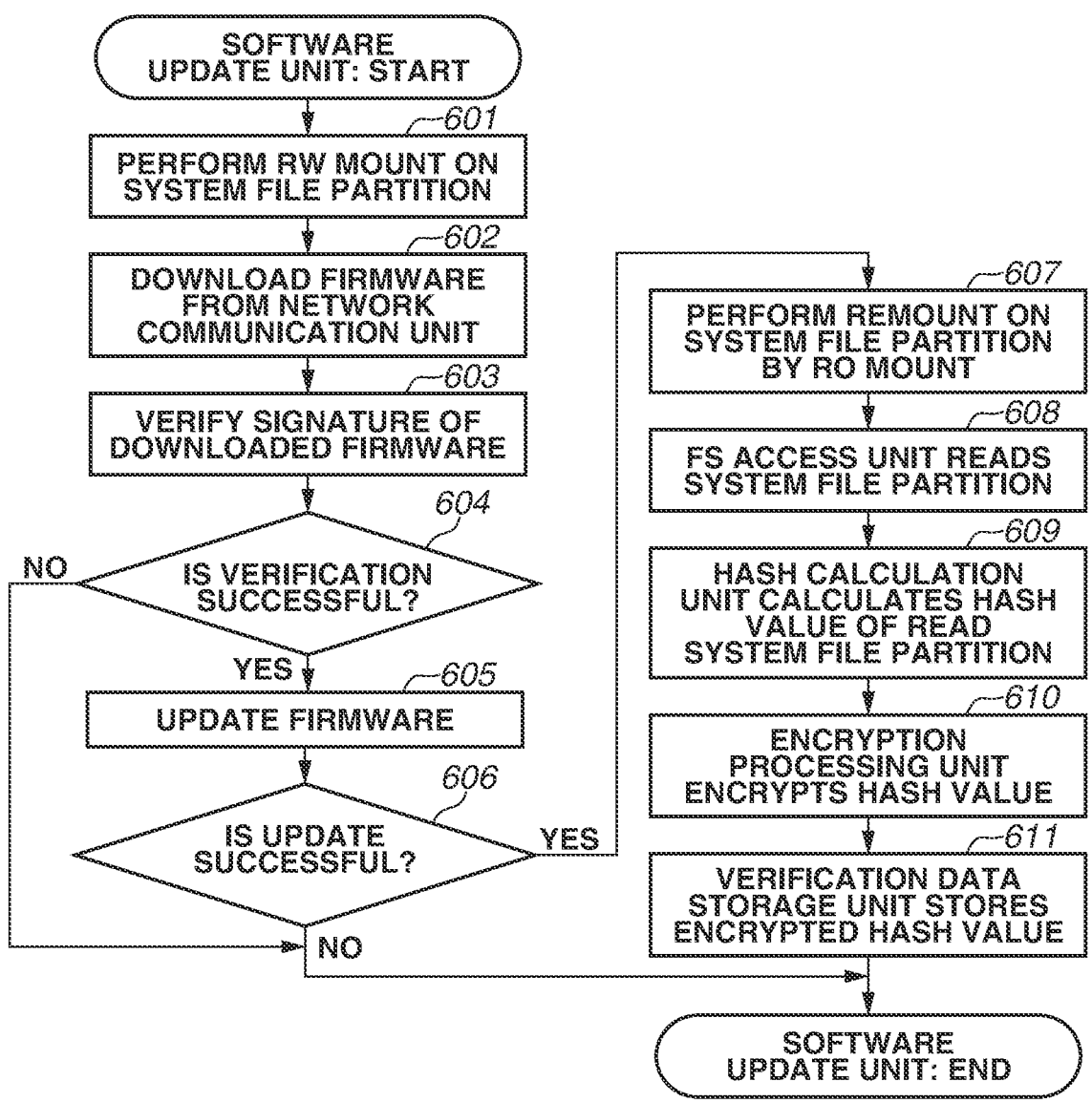
FIG. 6 is a flowchart illustrating an operation of a software update unit.

FIG. 6 is a flowchart illustrating an operation of the software update unit 505. If the user performs a "firmware update instruction" operation using the UI operation unit 103, the software update unit 505 starts to operate. In FIG. 6, in step S601, the software update unit 505 performs a read/write (RW) mount on the system file partition 201. The RW mount is a procedure for enabling reading and writing to and from the system file partition 201. Normally, a read-only (RO) mount is performed because only reading is performed. However, writing needs to be performed only when a system file is updated, and therefore, the RW mount is performed. Next, in step S602, the software update unit 505 connects to an update server that stores an update file from the network communication unit 102 via the network 126. Then, the software update unit 505 downloads a system file and temporarily copies the system file to the setting data partition 202 in the storage device 107. The update server is a server placed on the Internet and provided by the manufacturer. The system file may be downloaded from a portable device such as a Universal Serial Bus (USB) memory, instead of the server. Next, in step S603, the software update unit 505 verifies the signature of the downloaded system file. The "signature" refers to a mechanism for assigning signature data signed using the private key of the manufacturer to a system file, verifying the signature data using a certificate (not illustrated) embedded in the multifunction peripheral 101, and verifying whether the system file is a legitimate system file, thereby confirming whether an improper falsification is performed on a transfer path. In step S604, if the verification fails (No in step S604), the processing ends. If the verification is successful (Yes in step S604), then in step S605, the software update unit 505 updates the system file. The "update" refers to moving the system file placed in the setting data partition 202 in step S602 to a predetermined position in the system file partition 201. Further, in step S606, if the update is not successful (No in step S606), the processing ends. If the update is successful (Yes in step S606), the processing proceeds to step S607. In step S607, the software update unit 505 performs a mount on the system file partition 201 again (a remount) by a RO mount. At this timing, the rewriting of the system file partition 201 is completed. From this point onward, normally, the partition is not rewritten until the next update is performed. In step S608, the FS access unit 501 reads the system file partition 201. In step S609, the hash calculation unit 502 calculates the hash value of the read system file partition 201. Further, in step S610, the encryption processing unit 503 encrypts the hash value. In step S611, the verification data storage unit 504 stores the encrypted hash value. Then, the series of processes is completed.

The above calculation of the hash value uses, for example, the SHA-256 hash calculation algorithm. This algorithm creates a hash value of 32 bytes from input data of any size. The hash calculation algorithm is characterized by one-wayness in which it is easy to create output data from input data, but it is logically difficult to calculate different input data to output the same output data. Using this characteristic, it is realistically impossible to derive the same value as a hash value calculated from a legitimate system file partition from the result of an improper falsification. Thus, it is possible to verify the presence or absence of a falsification by verifying the hash value.

The above hash value is encrypted because, if the hash value is stored as plain text in the verification data storage unit 504, the hash value may be rewritten by an improper attack. The encryption can prevent this area from being improperly rewritten. Next, the confirmation of the falsification of a system file placed in the system file partition 201 is described.

Figure 7:
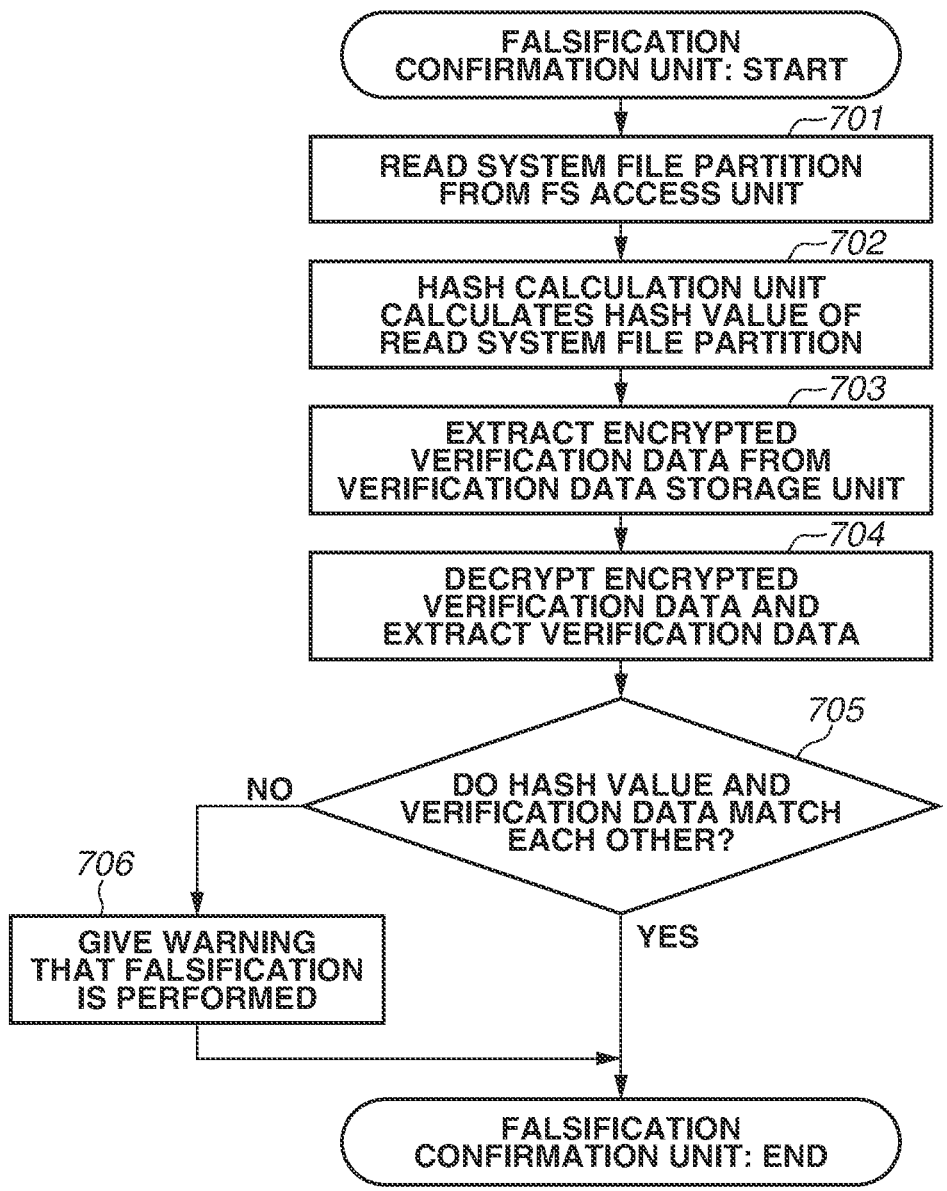
FIG. 7 is a flowchart illustrating an operation of a falsification confirmation unit.

FIG. 7 is a flowchart illustrating the operation of the firmware falsification confirmation unit 506.

The firmware falsification confirmation unit 506 is a module that, at a predetermined timing, confirms whether the system file partition 201 is falsified. The predetermined timing may be the time when the multifunction peripheral 101 starts by being powered on, or may be the time when an administrator operates the UI operation unit 103. In a case where there is a clock, the firmware falsification confirmation unit 506 may start at a fixed time (e.g., midnight). In the present exemplary embodiment, if the user gives a falsification confirmation instruction using the UI operation unit 103, the firmware falsification confirmation unit 506 operates.

When the firmware falsification confirmation unit 506 starts, then in step S701, the firmware falsification confirmation unit 506 reads the system file partition 201 from the FS access unit 501. In step S702, the hash calculation unit 502 calculates the hash value. The hash calculation unit 502 uses the same hash calculation algorithm as the hash algorithm used in step S608 (i.e., SHA-256). Next, in step S703, the firmware falsification confirmation unit 506 extracts encrypted verification data stored in the verification data storage unit 504. In step S704, the firmware falsification confirmation unit 506 passes the encrypted verification data to the encryption processing unit 503, and the encryption processing unit 503 decrypts the encrypted verification data. Next, in step S705, the firmware falsification confirmation unit 506 compares the hash value calculated in step S702 and the verification data decrypted in step S704. If the hash value and the verification data match each other (Yes in step S705), the firmware falsification confirmation unit 506 does not perform anything in particular, and the processing ends. If the hash value and the verification data do not match each other (No in step S705), then in step S706, the firmware falsification confirmation unit 506 gives a warning that a falsification is performed. Examples of the warning method include a method for displaying the warning on the UI operation unit 103, and a method for notifying the administrator of the warning by email using an email address registered in advance.

Next, the detection of the falsification of setting data is described. Setting data is data that is stored in the setting data partition 202 and determines the operation of a function of the multifunction peripheral 101.

The setting data partition 202 is an area that stores the setting data. Examples of the stored setting data include information related to printing such as the setting of the sheet size and the setting of color when the multifunction peripheral 101 performs printing, transmission information such as the destination of a fax transmission, and also settings related to security such as the setting of user authentication and the setting of the use of encryption in communication.

The difference between a setting related to security and a setting unrelated to security in the setting data is described. The multifunction peripheral 101 may store a confidential document used in an office, and therefore needs to limit users allowed to access the confidential document. Normally, to operate the multifunction peripheral 101, user authentication is performed in advance, and access authority is given to only a user allowed to access the confidential document, thereby preventing unauthorized access. To thus properly authenticate a user, a setting regarding the user authentication is made.

In a case that the multifunction peripheral 101 can be hacked, the setting of the user authentication can be changed or deleted. In this case, the user authentication itself can be disabled, or the authority to access the confidential document can be given to an unauthorized user.

Or suppose that measures are taken to set a communication system to perform encrypted communication using a known technique such as Transport Layer Security (TLS) so that even if a path is wiretapped, a confidential document flowing through the path is not leaked. Also in this case, the encrypted communication is turned off by rewriting the setting data, whereby it is also possible to transmit the confidential document as plain text and wiretap the path, thereby leaking information.

On the other hand, setting data unrelated to security refers to a setting related to the input and output of a document, such as the setting of the sheet size or the setting of whether to output a document in monochrome or color, and refers to a setting that influences the result of the output, but is not related to information leakage by hacking.

The setting data may be set through the input unit 123, may be set through a network interface of the multifunction peripheral 101, or may be imported from a backed up setting value. In any case, access control is performed so that only an administrator given authority through user authentication can set the setting data. An attacker skilled enough to attempt to falsify firmware can attempt to hack the multifunction peripheral 101 by taking advantage of an unreleased vulnerability of the multifunction peripheral 101. Thus, the attacker may avoid the access control that is executed by performing the user authentication and improperly rewrite setting data related to security. A method for preventing improper rewriting is described below.

Figure 8:
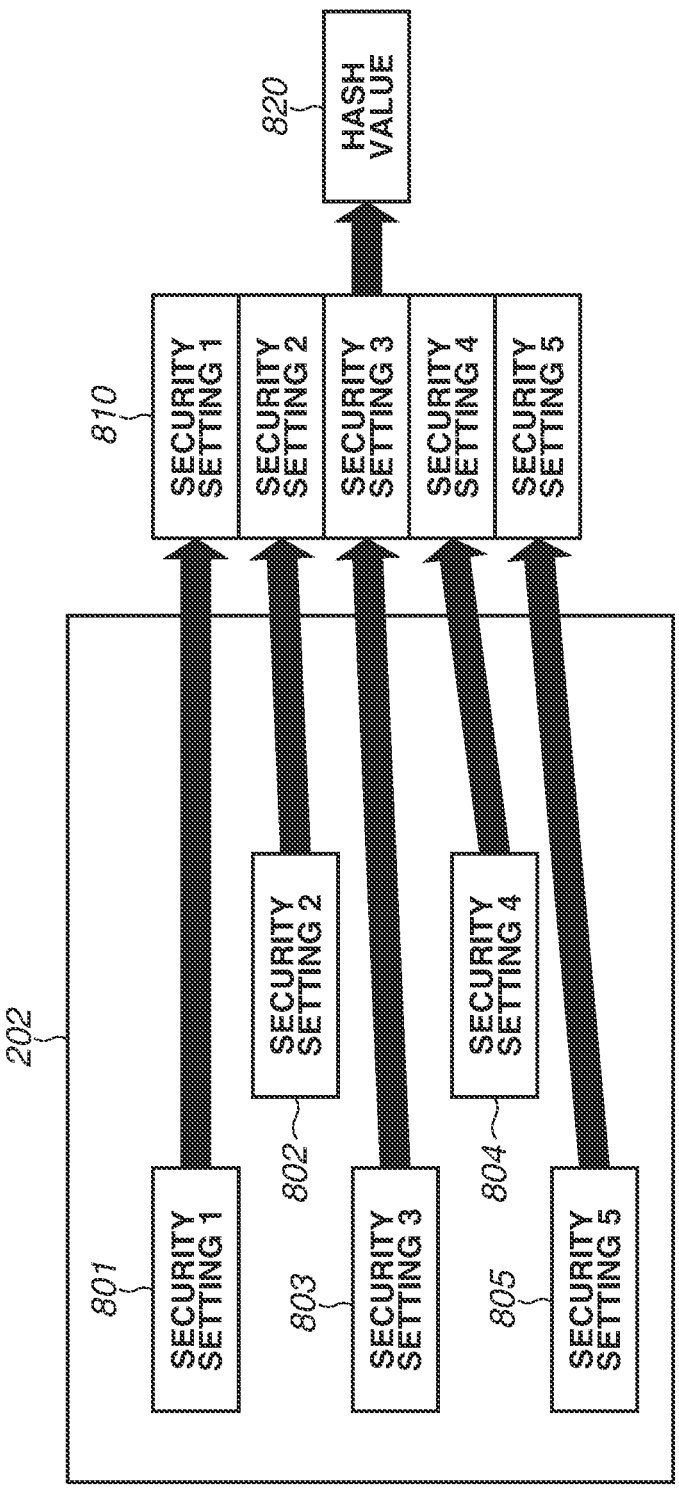
FIG. 8 is a schematic diagram illustrating detection of a falsification of setting data.

FIG. 8 is a schematic diagram illustrating the detection of the falsification of the setting data.

FIG. 8 illustrates the setting data partition 202 and pieces of security data 801 to 805 corresponding to security settings 1 to 5 related to security in the setting data. Actually, setting data other than that related to security is also stored in an area other than those of the pieces of security data 801 to 805.

Coupled data 810 is obtained by extracting and coupling the pieces of security data 801 to 805. A hash value 820 is the result of calculating a hash value from the coupled data 810 using a known hash function such as SHA-256. If any of the security settings 1 to 5 as the elements constituting the coupled data 810 is improperly changed, the hash value has a completely different value. Thus, a falsification can be detected.

Figure 9:
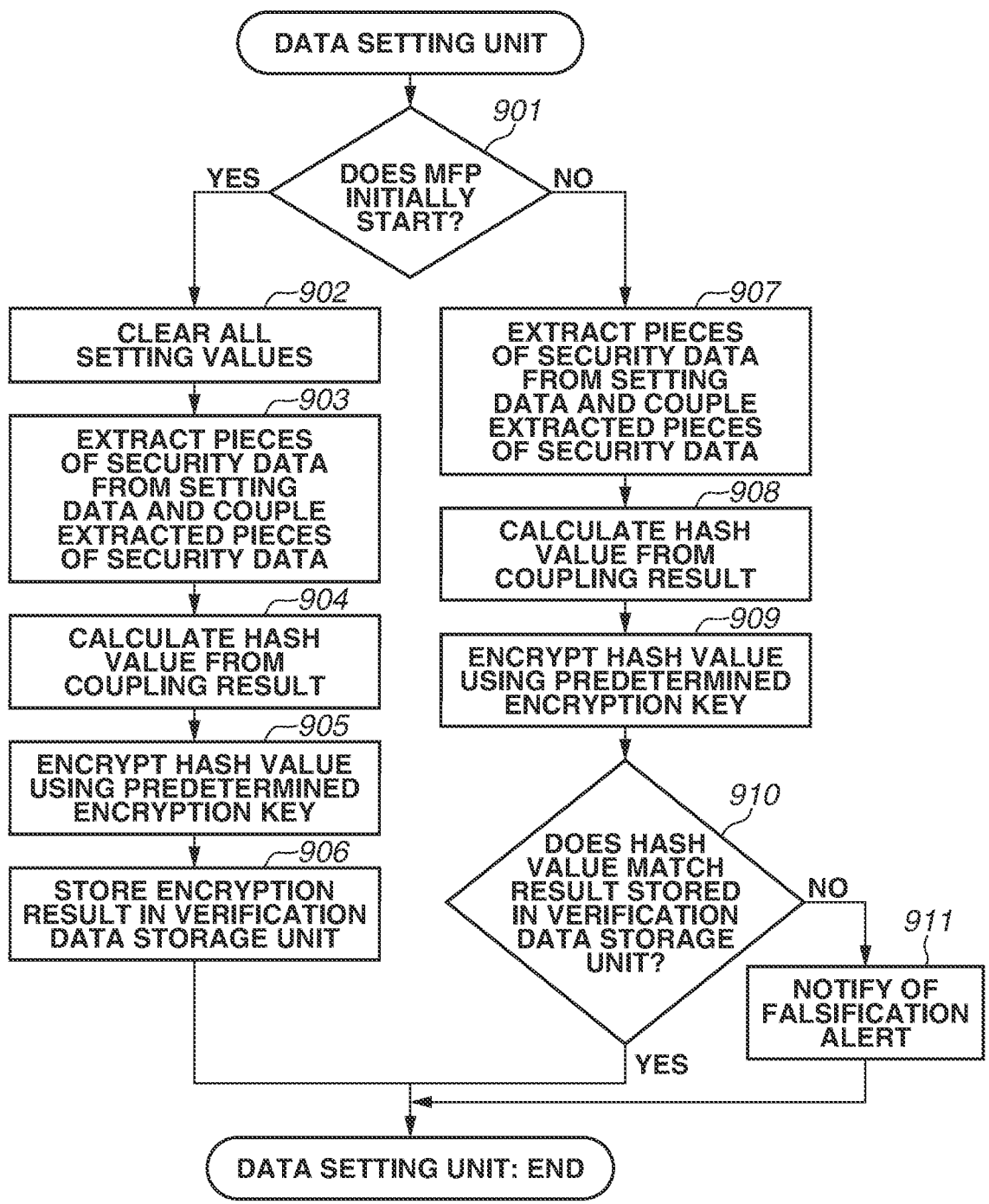
FIG. 9 is a flowchart illustrating an operation of a setting unit when the multifunction peripheral starts.

FIG. 9 is a flowchart illustrating the operation of the setting unit (data setting unit) 507 when the multifunction peripheral 101 starts.

At the timing when the multifunction peripheral 101 is powered on, the setting unit 507 starts to operate. In FIG. 9, in step S901, the setting unit 507 determines whether the multifunction peripheral 101 initially starts. If the multifunction peripheral 101 initially starts (Yes in step S901), then in step S902, the setting unit 507 clears all setting values. Next, in step S903, the setting unit 507 extracts pieces of data related to security settings from the setting data and couples the extracted pieces of data as the coupled data 810. The coupled data 810 is temporarily stored in the RAM 120.

FIG. 19 illustrates an example of a file configuration on the storage device 122 that stores the setting data.

FIG. 19 illustrates an item name 1901 of the setting data. A security attribute 1902 indicates a security setting. If the security attribute 1902 is "Yes", this corresponds to a setting regarding security. If the security attribute 1902 is "No", this indicates a setting other than a setting regarding security. FIG. 19 also illustrates a setting value 1903. In the rows, a setting 1911 indicates whether to perform user authentication, a setting 1912 indicates whether to encrypt a communication path, a setting 1913 indicates printing in color or monochrome, and a setting 1904 indicates the sheet size of a sheet on which printing is to be performed. These settings are merely examples, and normally, more setting items are included. Examples of a setting of which the security attribute 1902 is "Yes" (a security setting) include a password setting, an encryption setting, an authentication setting, and a wireless local area network (LAN) setting.

Figure 10:
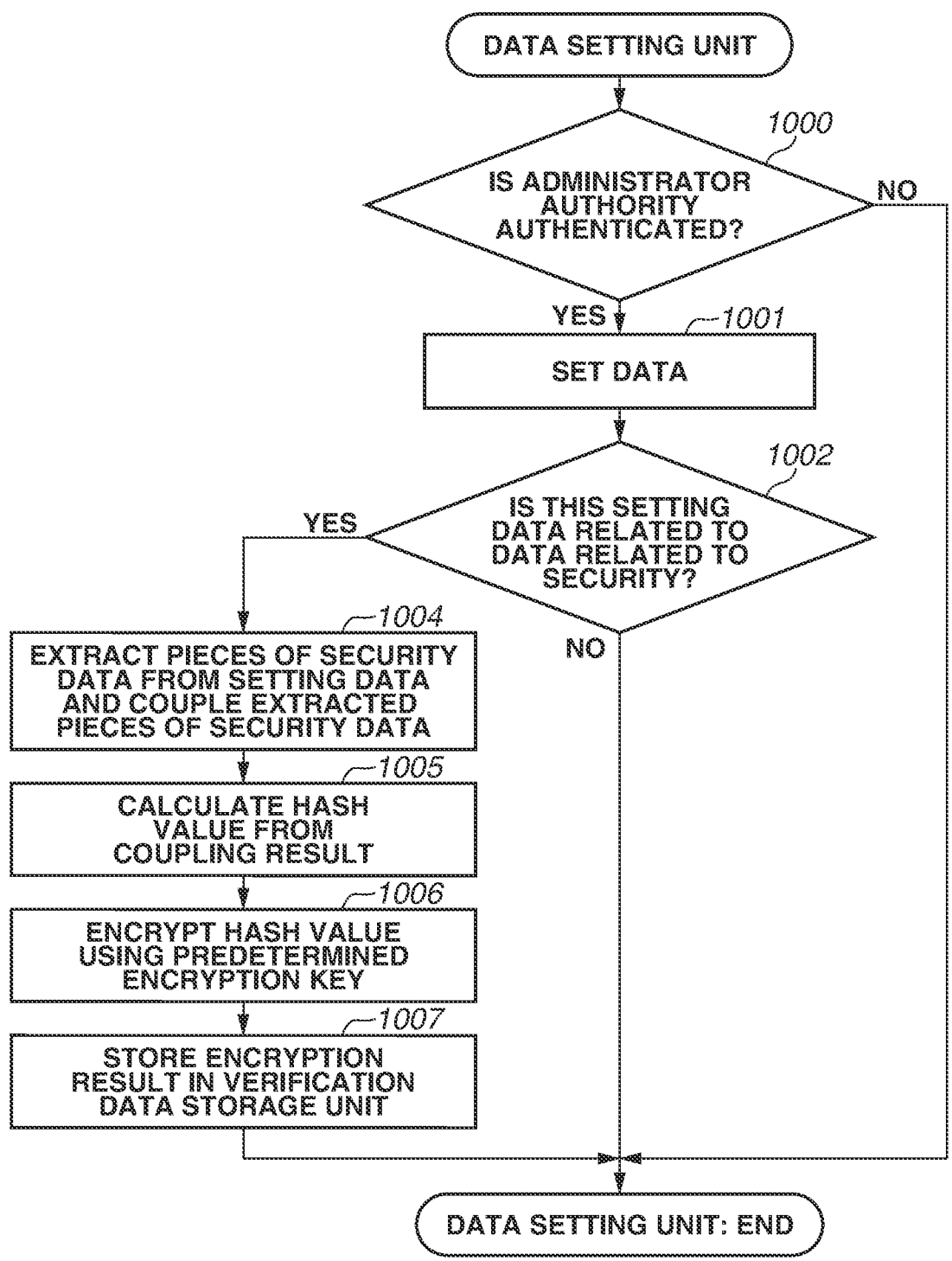
FIG. 10 is a flowchart illustrating an operation of a data setting unit in a case where a setting is changed using the data setting unit.

In step S1002 of the flowchart in FIG. 10, the determination of whether data to be currently set is related to security can be made by determining whether the security attribute 1902 is "Yes".

Next, in step S904, the setting unit 507 creates the hash value 820 from the coupled data 810. Next, in step S905, the setting unit 507 encrypts the hash value 820 using a predetermined encryption key. The encryption may be performed by a common key encryption method or a public key encryption method. The predetermined encryption key only needs to be a key stored in hardware according to Trusted Platform Module (TPM) that manages a key, and created with respect to each individual multifunction peripheral 101, and any encryption method may be used as long as the method is capable of guaranteeing that an attacker cannot improperly use the encryption key.

Next, in step S906, the setting unit 507 stores the encryption result in the verification data storage unit 504. If, on the other hand, it is determined in step S901 that the multifunction peripheral 101 starts for the second or subsequent time (No in step S901), then in step S907, similarly to step S903, the setting unit 507 extracts pieces of data related to security settings from the setting data and couples the extracted pieces of data as the coupled data 810. The coupled data 810 is temporarily stored in the RAM 120. Next, in step S908, the setting unit 507 creates the hash value 820 from the coupled data 810. Next, in step S909, the setting unit 507 encrypts the hash value 820 using the predetermined encryption key.

Next, in step S910, the setting unit 507 compares the hash value 820 with the result stored in the verification data storage unit 504. If the hash value 820 matches the stored result (Yes in step S910), this indicates that the security settings are made by a legitimate method. Then, the start process ends. If the hash value 820 does not match the stored result (No in step S910), the setting unit 507 regards that a falsification is performed. Then, in step S911, the setting unit 507 gives a warning that a falsification is performed. Examples of the warning method include a method for displaying the warning on the UI operation unit 103, and a method for notifying the administrator of the warning by email using an email address registered in advance.

FIG. 10 is a flowchart illustrating the operation of the setting unit (data setting unit) 507 in a case where a setting is changed using the data setting unit 507. The setting data on the device may be directly input using the input unit 123, or may be input through a web interface using HTTP via the network communication unit 102. A setting may also be backed up or restored, or a setting value may also be imported from another individual multifunction peripheral 101. In any case, the setting needs to be changed based on administrator authority, and the setting is made through the data setting unit 507. An example is described where the user can set or change the setting data in a case where the user has the administrator authority. If, however, the user is not an administrator, but has authority to set the setting data, the user may be permitted to set or change the setting data.

In FIG. 10, in step S1000, the data setting unit 507 confirms whether the administrator authority is authenticated. When the multifunction peripheral 101 is used, user authentication is performed using the input unit 123. In the user authentication, identification of the user is confirmed by inputting a predetermined identifier (ID) and a predetermined password, or using biometrics information such as the input of a fingerprint. Specifically, if the input information regarding the user and information regarding a user having the administrator authority held in the apparatus match each other, the authentication is successful. If the authentication of the user as a user having the administrator authority is successful, it is determined that the administrator authority is authenticated. However, if not, the data setting unit 507 does not perform any processing at this time, and the processing is completed. If it is determined that the administrator authority is authenticated (Yes in step S1000), then in step S1001, the setting data is set in the setting unit 507. Actually, the setting data is written to the storage device 122. In the present exemplary embodiment, when the setting data is set, the setting can be received only from a user having the authority. Next, in step S1002, the data setting unit 507 determines whether the setting data to be currently set is setting data related to security. This comparison can be made by statically holding a security attribute according to the type of setting data. Also in this step, the determination can be made based on the value of the security attribute 1902 illustrated in FIG. 19.

If the setting data is unrelated to security (No in step S1002), the processing is completed. If the setting data is related to security (Yes in step S1002), the processing branches to step S1004. In step S1004, the data setting unit 507 extracts pieces of data related to security from the setting data and couples the extracted pieces of data as the coupled data 810. The extraction of the pieces of data related to security is performed by extracting items of which the security attribute 1902 is "Yes". The coupled data 810 is temporarily stored in the RAM 120. Next, in step S1005, the data setting unit 507 creates the hash value 820 from the coupled data 810. Next, in step S1006, the data setting unit 507 encrypts the hash value 820 using the predetermined encryption key. Next, in step S1007, the data setting unit 507 stores the encryption result in the verification data storage unit 504.

As described above, in a case where the setting data is rewritten by a legitimate procedure, it is confirmed in step S1000 that an administrator is authenticated. In a case where a security setting is changed, verification data is recalculated and saved. Due to this step, after the multifunction peripheral 101 starts next time, it can be determined by the verification process in step S910 that the hash value 820 matches correct verification data. Thus, a proper operation can be performed.

On the other hand, a case is considered where data in the setting unit 507 is improperly rewritten by an act such as improper hacking. Even if an attempt is made to rewrite a setting using the data setting unit 507, since the authentication process is not performed, it is determined that the administrator authority is not authenticated in step S1000, and the setting cannot be rewritten.

In a case where the setting unit 507 is directly rewritten, since steps S1004 to S1007 for calculating verification data are not performed, verification data cannot be updated. After the multifunction peripheral 101 starts next time, it can be clarified by the verification process in step S910 that the hash value 820 does not match correct verification data. Thus, by giving a warning, it can be detected that the setting unit 507 is improperly rewritten. Even if an attempt is made to justify the falsification of the setting data by improperly rewriting verification data, the encryption key stored in a secure chip according to TPM cannot be extracted. Thus, the verification data cannot be forged, either.

Further, the program itself for the data setting unit 507 starts after the firmware falsification confirmation unit 506 confirms that a falsification is not performed. Thus, the processing of the flowcharts represented in FIGS. 9 and 10 cannot be changed. If the processing is changed, the change is considered as a falsification, and a warning is given in step S706.

As described above, at the timing when a setting value related to security is set, verification data on the security setting is generated, encrypted, and stored. When the multifunction peripheral 101 starts or at any timing, verification data is generated again. Then, the verification data is compared with the stored value. If the verification data does not match the stored value, it is determined that the setting value is falsified.

FIG. 20 illustrates examples of the influence of a change in a security setting. As illustrated in FIG. 20, even if the firmware is not falsified, the multifunction peripheral 101 can be improperly used by changing a security setting.

Based on the above, in a case where setting data regarding security is falsified by a person other than a proper administrator using an improper method, the multifunction peripheral 101 cannot be caused to operate without a warning. Thus, the multifunction peripheral 101 can be used in the state where a security setting is proper.

In the first exemplary embodiment, to verify the setting data, the setting falsification confirmation unit 508 is included inside the multifunction peripheral 101. As another configuration, the setting falsification confirmation unit 508 may be provided outside the multifunction peripheral 101.

Figure 11:
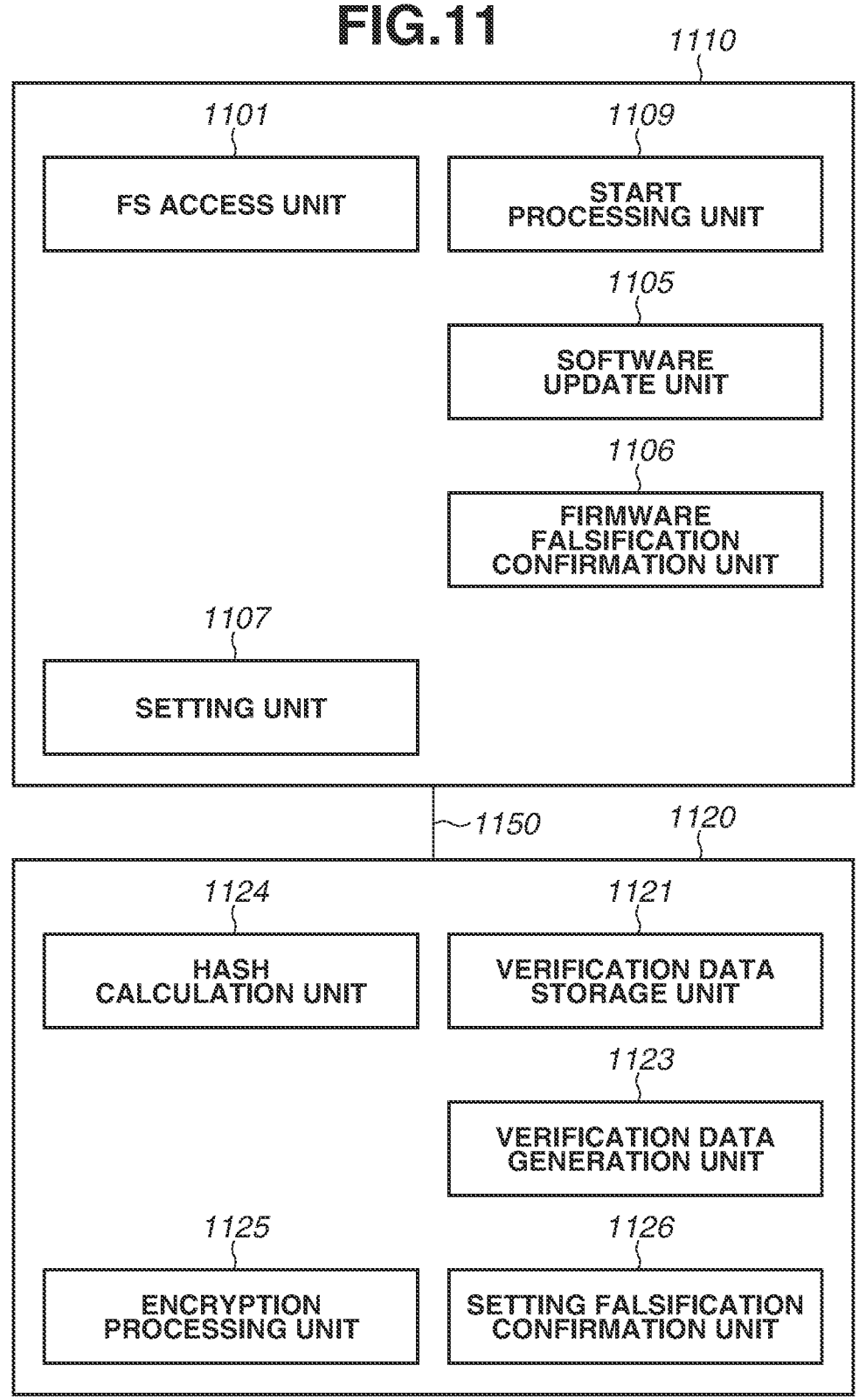
FIG. 11 is a block diagram of programs that operate on a multifunction peripheral and a server device according to one or more aspects of the present disclosure.

FIG. 11 is a block diagram of programs that operate on a multifunction peripheral 1110 and a server device 1120 according to a second exemplary embodiment. In FIG. 11, the multifunction peripheral 1110 and the server device 1120 are connected together by a network 1150. In the multifunction peripheral 1110, an FS access unit 1101 accesses the storage device 107. A software update unit 1105 updates software when a failure or a vulnerability is found. A firmware falsification confirmation unit 1106 confirms whether software is falsified or improper software is installed. A setting unit 1107 is used by the user to set the multifunction peripheral 1110. A start processing unit 1109 initializes the multifunction peripheral 1110 when the multifunction peripheral 1110 starts.

In the server device 1120, a verification data storage unit 1121 stores verification data unique to the multifunction peripheral 1110. A verification data generation unit 1123 updates verification data when the multifunction peripheral 1110 properly updates the setting data. A hash calculation unit 1124 calculates, from input data input to the hash calculation unit 1124, output data of a fixed size (e.g., 32 bytes) unique to the input data using a known hash calculation algorithm (e.g., SHA-256). The hash calculation algorithm is characterized by one-wayness in which it is easy to create output data from input data, but it is logically difficult to generate different input data to output the same output data. An encryption processing unit 1125 generates, from input data input to the encryption processing unit 1125, encrypted output data corresponding to the input data using a known encryption algorithm (e.g., AES). A setting falsification confirmation unit 1126 confirms whether a setting is improperly falsified.

Figure 12:
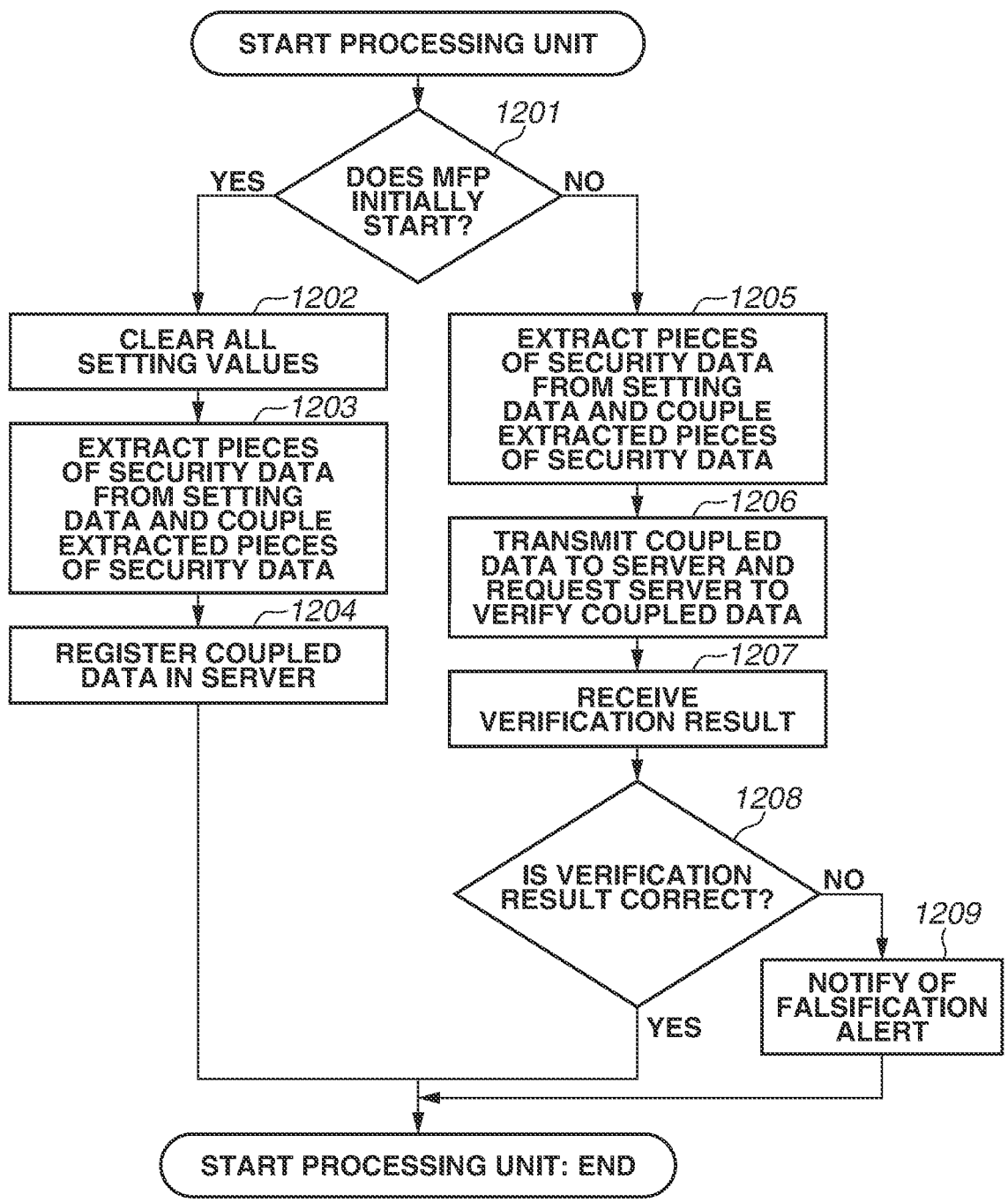
FIG. 12 is a flowchart illustrating an operation of a start processing unit.

FIG. 12 is a flowchart illustrating the operation of the start processing unit 1109. At the timing when the multifunction peripheral 1110 is powered on, the start processing unit 1109 starts to operate. In FIG. 12, in step S1201, the start processing unit 1109 determines whether the multifunction peripheral 1110 initially starts. If the multifunction peripheral 1110 initially starts (Yes in step S1201), then in step S1202, the start processing unit 1109 clears all setting values. Next, in step S1203, the start processing unit 1109 extracts pieces of data related to security settings from the setting data and couples the extracted pieces of data as the coupled data 810. The coupled data 810 is temporarily stored in the RAM 120. Next, in step S1204, the start processing unit 1109 registers the coupled data 810 in the server device 1120.

If, on the other hand, it is determined in step S1201 that the multifunction peripheral 1110 starts for the second or subsequent time (No in step S1201), then in step S1205, similarly to step S1203, the start processing unit 1109 extracts pieces of data related to security settings from the setting data and couples the extracted pieces of data as the coupled data 810. The coupled data 810 is temporarily stored in the RAM 120. Next, in step S1206, the start processing unit 1109 transmits the coupled data 810 to the server device 1120 and requests the server device 1120 to verify the coupled data 810. In step S1207, the start processing unit 1109 receives the verification result. Next, in step S1208, the start processing unit 1109 determines whether the verification result is correct. If the verification result is correct (Yes in step S1208), this indicates that the security settings are made by a legitimate method. Then, the start process ends. If the verification result is not correct (No in step S1208), the start processing unit 1109 determines that a falsification is performed. Then, in step S1209, the start processing unit 1109 gives a warning that a falsification is performed. Examples of the warning method include a method for displaying the warning on the UI operation unit 103, and a method for notifying the administrator of the warning by email using an email address registered in advance.

Figure 13:
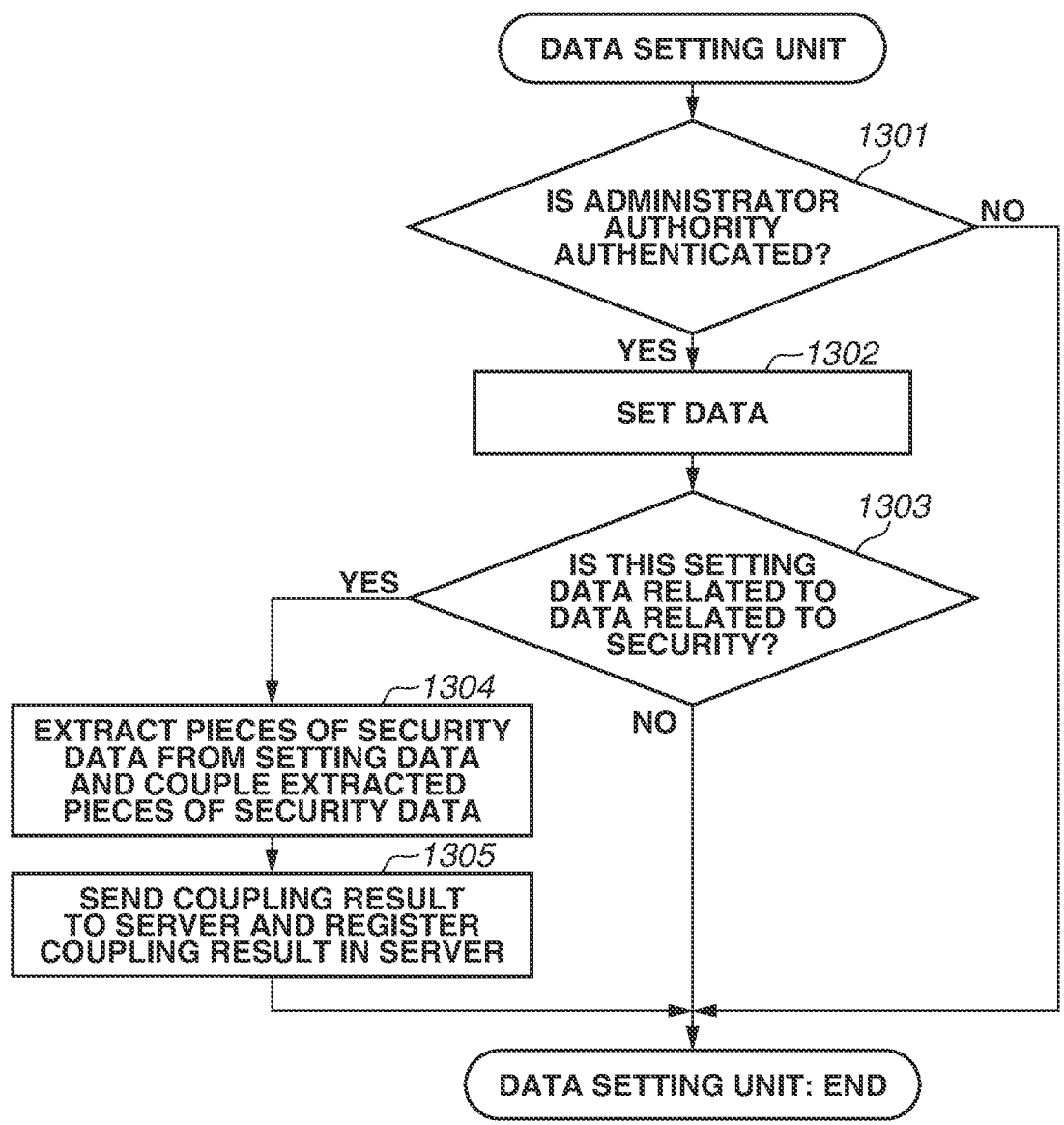
FIG. 13 is a flowchart illustrating an operation of a data setting unit in a case where a setting is changed using the data setting unit.

FIG. 13 is a flowchart illustrating the operation of the setting unit (data setting unit) 1107 in a case where a setting is changed using the data setting unit 1107. In FIG. 13, in step S1301, the data setting unit 1107 confirms whether the administrator authority is authenticated. When the multifunction peripheral 1110 is used, user authentication is performed using the input unit 123.

If the administrator authority is not authenticated (No in step S1301), the data setting unit 1107 does not perform any processing at this time, and the processing is completed. If the administrator authority is authenticated (Yes in step S1301), then in step S1302, the setting data is set in the setting unit 1107. Actually, the setting data is written to the storage device 122.

Next, in step S1303, the data setting unit 1107 determines whether the setting data to be currently set is setting data related to security. This comparison can be made by statically holding a security attribute according to the type of setting data. If the setting data is unrelated to security (No in step S1303), the processing is completed. If the setting data is related to security (Yes in step S1303), the processing branches to step S1304. In step S1304, the data setting unit 1107 extracts pieces of data related to security settings from the setting data and couples the extracted pieces of data as the coupled data 810. The coupled data 810 is temporarily stored in the RAM 120.

Next, in step S1305, the data setting unit 1107 transmits the coupled data 810 to the server device 1120 and registers the coupled data 810 in the server device 1120.

Figure 14:
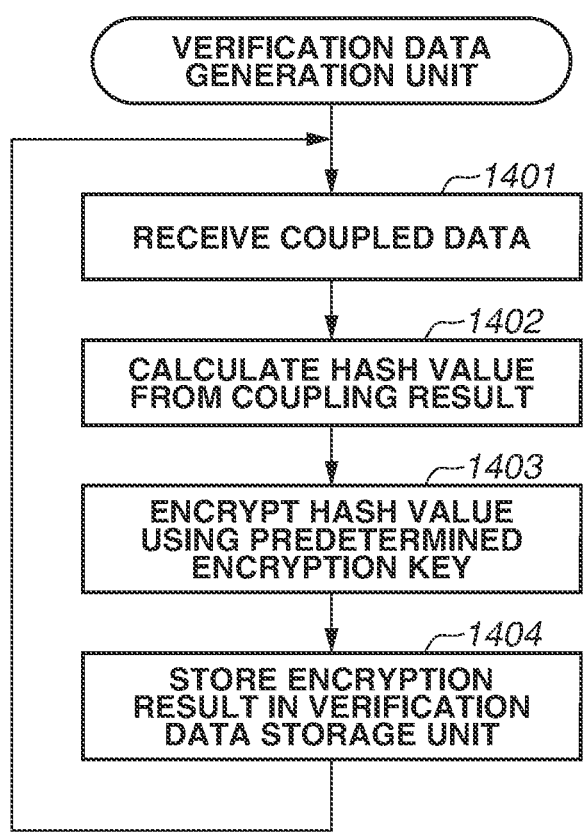
FIG. 14 is a flowchart illustrating an operation of a verification data generation unit on the server device.

FIG. 14 is a flowchart illustrating the operation of the verification data generation unit 1123 on the server device 1120. The verification data generation unit 1123 starts to operate when the server device 1120 is powered on, and then, the verification data generation unit 1123 continues to operate until the server device 1120 is shut down. In FIG. 14, in step S1401, the verification data generation unit 1123 receives the coupled data 810. Next, in step S1402, the verification data generation unit 1123 generates the hash value 820 from the coupling result. Next, in step S1403, the verification data generation unit 1123 encrypts the hash value 820 using the predetermined encryption key. Next, in step S1404, the verification data generation unit 1123 stores the encryption result in the verification data storage unit 1121. By following this procedure, the verification data generation unit 1123 calculates verification data on the multifunction peripheral 1110.

Figure 15:
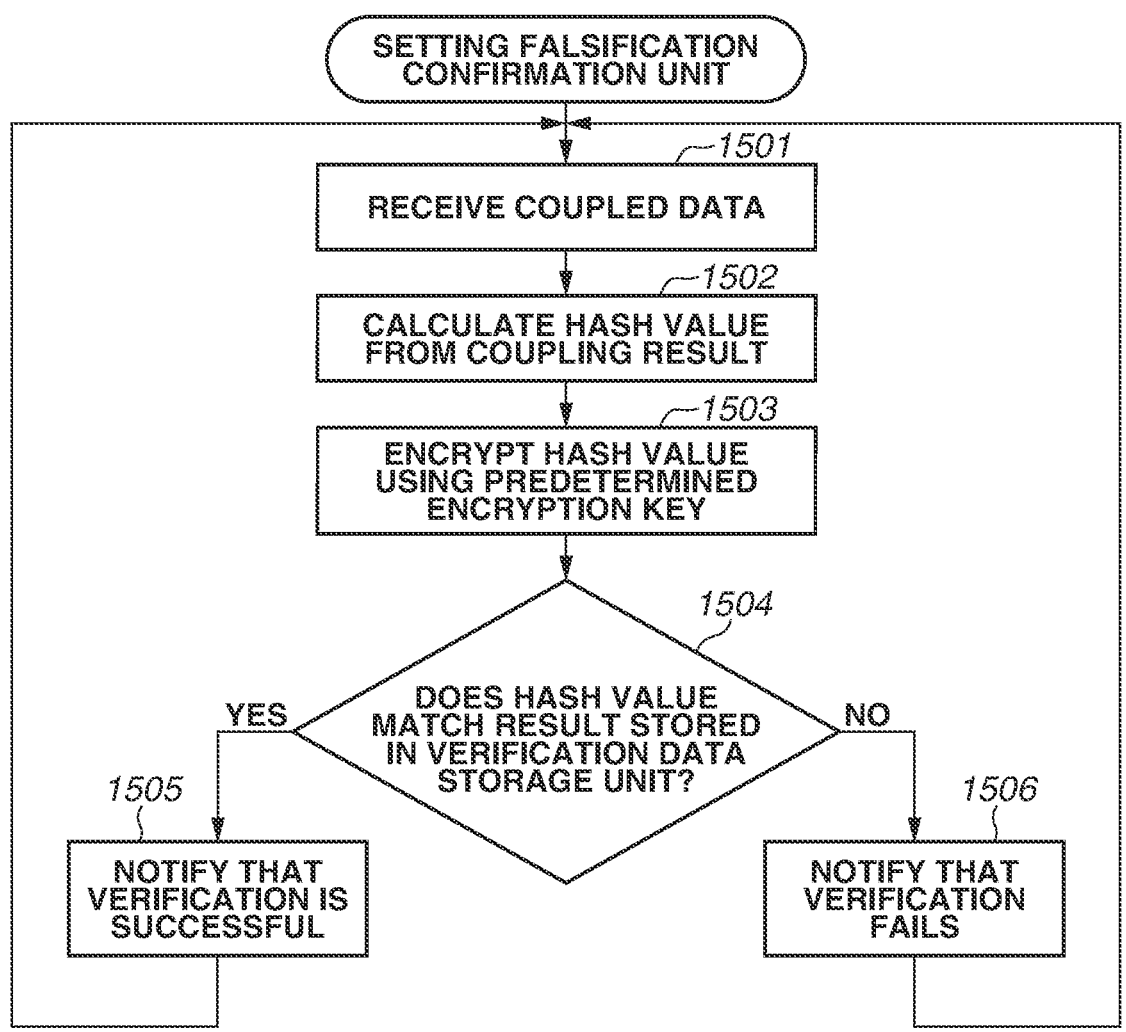
FIG. 15 is a flowchart illustrating an operation of a setting falsification confirmation unit on the server device.

FIG. 15 is a flowchart illustrating the operation of the setting falsification confirmation unit 1126 on the server device 1120. The setting falsification confirmation unit 1126 starts to operate when the server device 1120 is powered on, and then, the setting falsification confirmation unit 1126 continues to operate until the server device 1120 is shut down. In FIG. 15, in step S1501, the setting falsification confirmation unit 1126 receives the coupled data 810. Next, in step S1502, the setting falsification confirmation unit 1126 generates the hash value 820 from the coupling result. Next, in step S1503, the setting falsification confirmation unit 1126 encrypts the hash value 820 using the predetermined encryption key. Next, in step S1504, the setting falsification confirmation unit 1126 verifies whether the hash value 820 matches the result stored in the verification data storage unit 1121. If the hash value 820 matches the stored result (Yes in step S1504), then in step S1505, the setting falsification confirmation unit 1126 notifies the multifunction peripheral 1110 that the verification is successful. If the hash value 820 does not match the stored result (No in step S1504), then in step S1506, the setting falsification confirmation unit 1126 notifies the multifunction peripheral 1110 that the verification fails.

If the notification reaches the multifunction peripheral 1110, then in step S1208, the start processing unit 1109 determines whether the verification result is correct. If the setting data is falsified (No in step S1208), then in step S1209, the start processing unit 1109 gives an alert (warning).

As described above, in the configuration where the verification mechanism is separated from the multifunction peripheral 1110, a server stored in a physically safe place can hold verification data more safely, and it is possible to detect a falsification.

In the first exemplary embodiment, if it is detected that the setting data is falsified, the multifunction peripheral 101 is configured to merely give an alert. In a third exemplary embodiment, a method for automatically restoring proper data is described.

Figure 16:
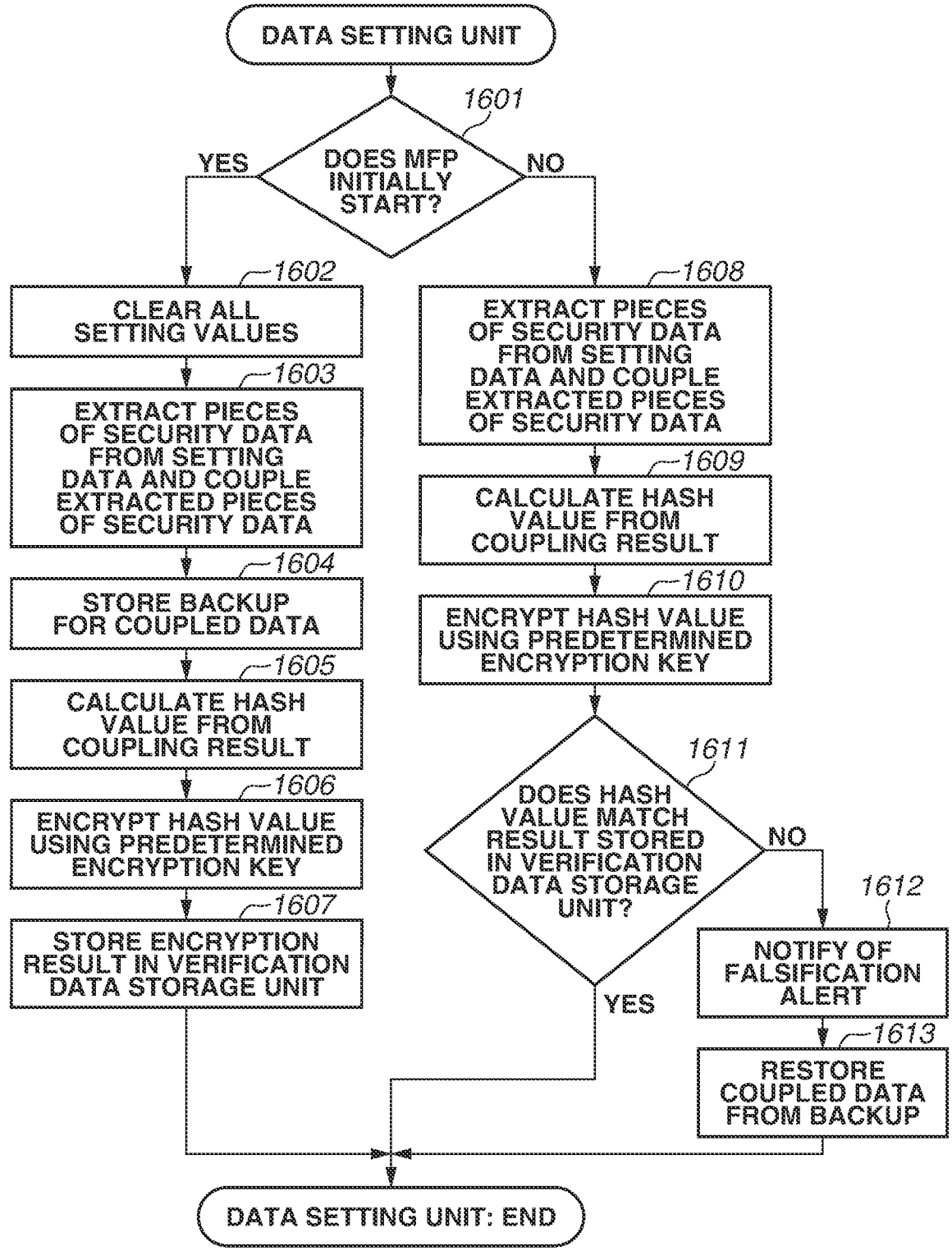
FIG. 16 is a flowchart illustrating an operation of a setting unit according to one or more aspects of the present disclosure.

FIG. 16 is a flowchart illustrating the operation of a setting unit (data setting unit) according to the present exemplary embodiment.

FIG. 16 is a variation of FIG. 9, and only the differences from FIG. 9 are described. In step S1604, the setting unit saves a backup for the coupled data 810 on the storage device 122. Further, after a falsification is detected, then in step S1613, the setting unit restores the coupled data 810 from the backup.

Figure 17:
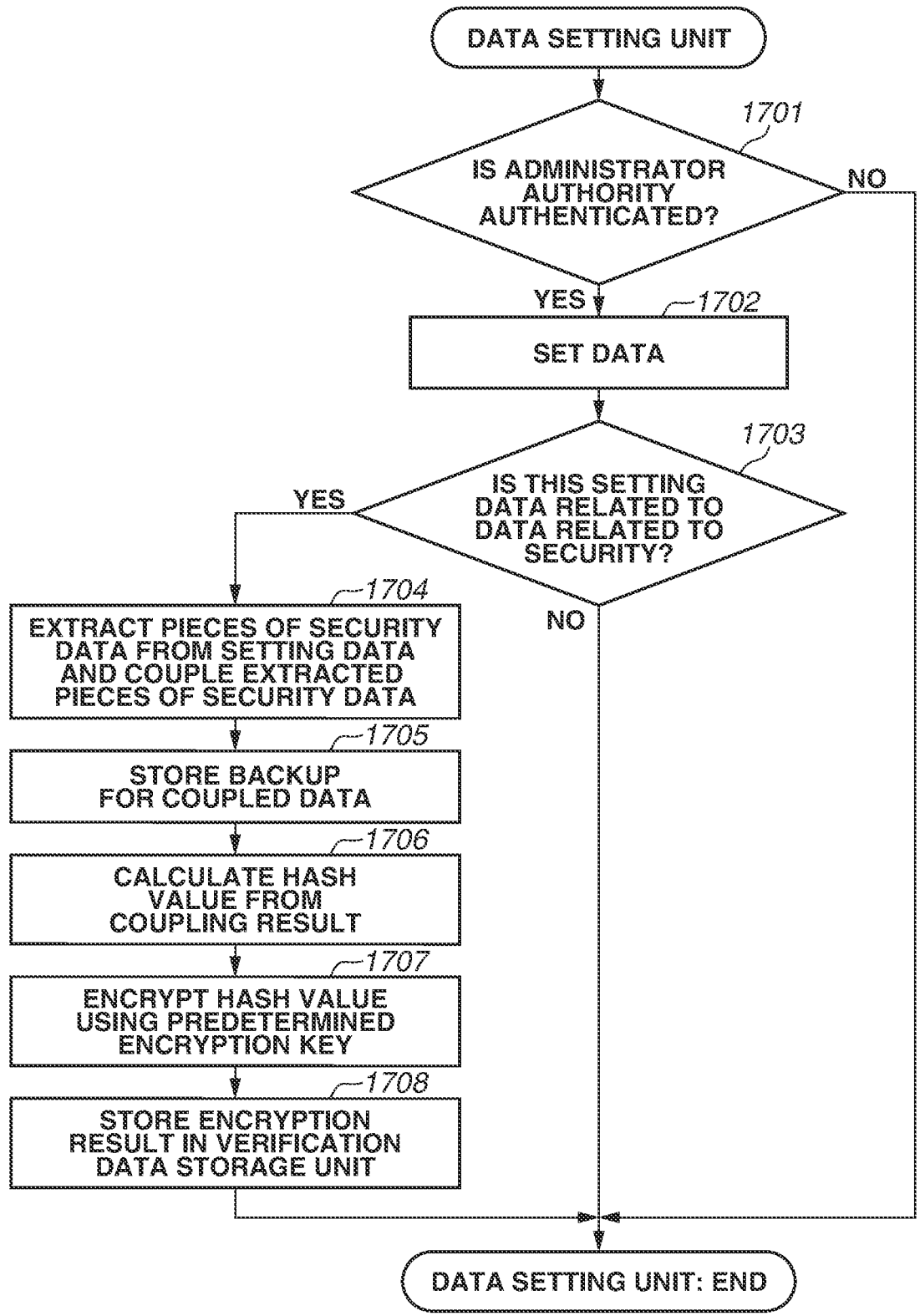
FIG. 17 is a flowchart illustrating an operation of a data setting unit according to one or more aspects of the present disclosure.

FIG. 17 is a flowchart illustrating the operation of the data setting unit according to the present exemplary embodiment.

FIG. 17 is a variation of FIG. 10, and only the differences from FIG. 10 are described. In step S1705, the data setting unit saves a backup for the coupled data 810 on the storage device 122. In step S1613, the backup saved in this step is subjected to the restoration process.

As described above, if setting data related to security is updated by a proper procedure, a backup is saved. Then, if, upon the detection of the falsification of the setting data, it is detected that the setting data is improperly updated, proper data is restored from the backup, whereby the setting data can also be restored by a method other than giving an alert. Thus, it is possible to reduce the downtime of the multifunction peripheral 110.

In the first exemplary embodiment, the falsification of the setting data is confirmed only once when the multifunction peripheral 110 starts. However, some falsification may be irregularly performed, and the setting data may be reflected on the function every time a change is made. Thus, in a fourth exemplary embodiment, a method for detecting a falsification during the operation of the multifunction peripheral 110 is added. A periodic falsification confirmation unit is added to the system according to the first exemplary embodiment. Processes other than that of the periodic falsification confirmation unit are similar to those in the first exemplary embodiment.

Figure 18:
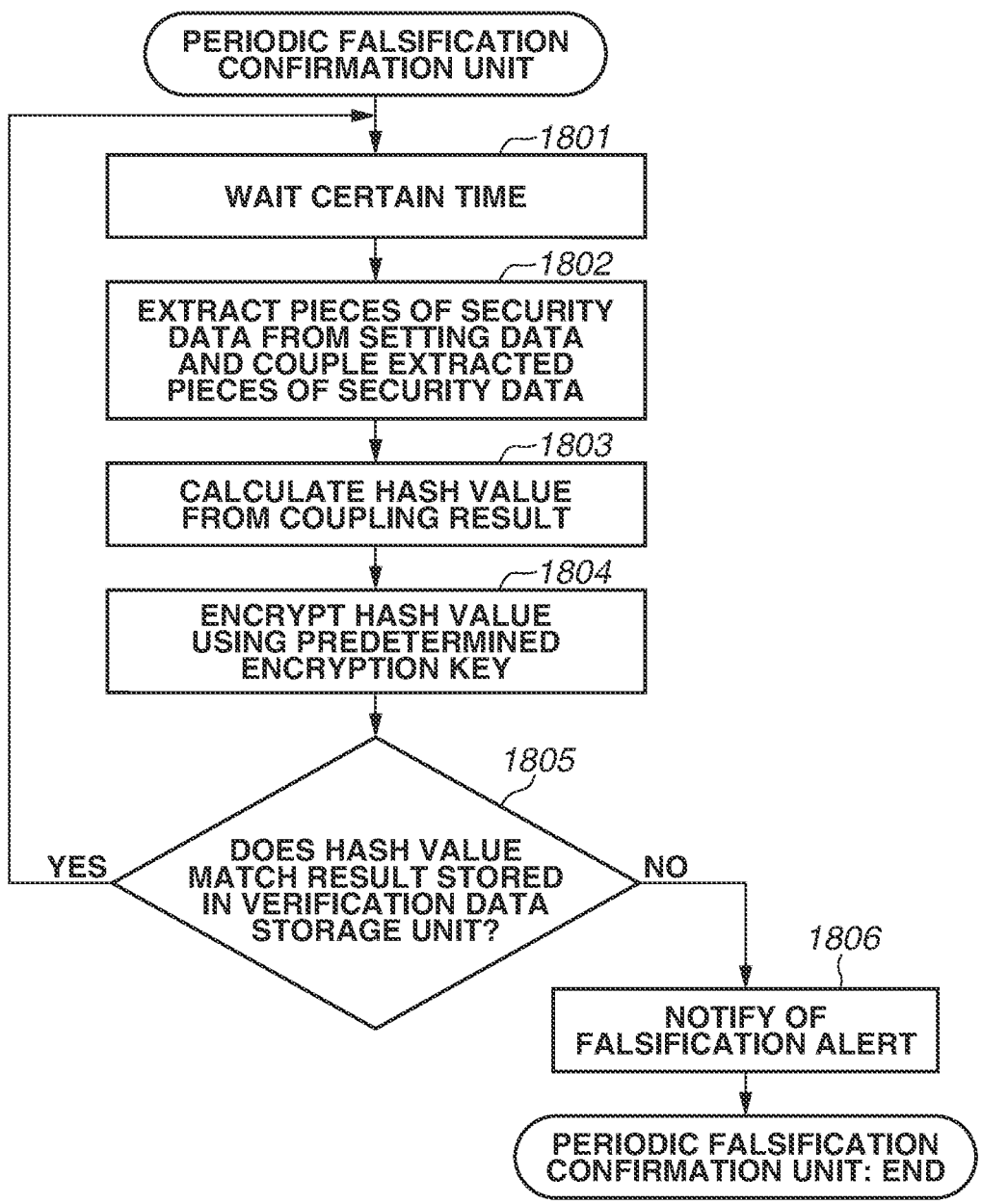
FIG. 18 is a flowchart illustrating an operation of a periodic falsification confirmation unit.

FIG. 18 is a flowchart illustrating the operation of the periodic falsification confirmation unit. The periodic falsification confirmation unit starts to operate when the multifunction peripheral 110 starts, and then, the periodic falsification confirmation unit continues to operate until a falsification is detected or the multifunction peripheral 110 is shut down. In FIG. 18, in step S1801, the periodic falsification confirmation unit waits a certain time. The certain time may be a setting included in the multifunction peripheral 110. The certain time is long enough not to impair the performance of the multifunction peripheral 110 by frequently confirming a falsification.

Next, in step S1802, the periodic falsification confirmation unit extracts pieces of data related to security settings from the setting data and couples the extracted pieces of data as the coupled data 810. The coupled data 810 is temporarily stored in the RAM 120. Next, in step S1803, the periodic falsification confirmation unit creates the hash value 820 from the coupled data 810. Next, in step S1804, the periodic falsification confirmation unit encrypts the hash value 820 using the predetermined encryption key. Next, in step S1805, the periodic falsification confirmation unit compares the hash value 820 with the result stored in the verification data storage unit 504. If the hash value 820 matches the stored result (Yes in step S1805), this indicates that the security settings are made by a legitimate method. Then, the processing returns to step S1801. If the hash value 820 does not match the stored result (No in step S1805), the periodic falsification confirmation unit determines that a falsification is performed. Then, in step S1806, the periodic falsification confirmation unit gives a warning that a falsification is performed.

As described above, the falsification of the setting data is confirmed every certain time even in the state where the multifunction peripheral 110 is operating. With this configuration, it is possible to minimize and prevent an improper operation on the multifunction peripheral 110 due to improper setting data.

According to the above exemplary embodiments, in a case where a setting value related to security is improperly rewritten, it is possible to detect the improper rewriting. The operation of an information processing apparatus is stopped, whereby it is possible to prevent the operation of the information processing apparatus in an improper setting state.

According to the above exemplary embodiments, even if a setting value of an apparatus is improperly rewritten, it is possible to prevent the apparatus from being improperly used.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-173743, filed Oct. 25, 2021, which is hereby incorporated by reference herein in its entirety.

What is claimed is:

1. An information processing apparatus comprising:
   a determination unit configured to determine whether a user has authority to set setting data;
   a reception unit configured to, in a case where it is determined that the user has the authority to set the setting data, receive a setting of the setting data;
   a generation unit configured to generate verification data on the received setting data; and
   a verification unit configured to, in a case where the information processing apparatus starts, verify the setting data using the verification data.

2. The information processing apparatus according to claim 1, further comprising a control unit configured to, in a case where the verification unit does not succeed in the verification, perform control to stop an operation of the information processing apparatus.

3. The information processing apparatus according to claim 1, wherein at a timing when the setting of the setting data is received, the generation unit generates verification data on the setting data of which the setting is received.

4. The information processing apparatus according to claim 1, wherein the generation unit extracts setting data related to security in the setting data and generates verification data on the setting data related to security.

5. The information processing apparatus according to claim 1, wherein the generation unit encrypts the setting data to generate verification data.

6. A control method for controlling an information processing apparatus, the control method comprising:
   determining whether a user has authority to set setting data;
   in a case where it is determined that the user has the authority to set the setting data, receiving a setting of the setting data;
   generating verification data on the received setting data; and
   in a case where the information processing apparatus starts, verifying the setting data using the verification data.

7. The control method for controlling the information processing apparatus according to claim 6, the control method further comprising, in a case where the verification is not successful, performing control to stop an operation of the information processing apparatus.

8. The control method for controlling the information processing apparatus according to claim 6, wherein at a timing when the setting of the setting data is received, verification data on the setting data of which the setting is received is generated.

9. The control method for controlling the information processing apparatus according to claim 6, wherein setting data related to security in the setting data is extracted, and verification data on the setting data related to security is generated.

10. The control method for controlling the information processing apparatus according to claim 6, wherein the setting data is encrypted to generate verification data.

11. A non-transitory computer readable storage medium that stores a program for causing a computer to execute a method of controlling an information processing apparatus, the method comprising:
   determining whether a user has authority to set setting data;
   in a case where it is determined that the user has the authority to set the setting data, receiving a setting of the setting data;
   generating verification data on the received setting data; and
   in a case where the information processing apparatus starts, verifying the setting data using the verification data.

* * * * *